(12) United States Patent
Notani et al.

(10) Patent No.: US 8,590,500 B2
(45) Date of Patent: Nov. 26, 2013

(54) SYSTEM FOR STARTING INTERNAL COMBUSTION ENGINE

(75) Inventors: Hideya Notani, Kariya (JP); Takashi Senda, Niwa-gun (JP)

(73) Assignee: Denso Corporation, Kariya (JP)

( * ) Notice: Subject to any disclaimer, the term of this patent is extended or adjusted under 35 U.S.C. 154(b) by 473 days.

(21) Appl. No.: 12/777,668

(22) Filed: May 11, 2010

(65) Prior Publication Data

US 2010/0282200 A1 Nov. 11, 2010

(30) Foreign Application Priority Data

May 11, 2009 (JP) ................................ 2009-114626
Feb. 11, 2010 (JP) ................................ 2010-028311

(51) Int. Cl.
- *F02N 11/00* (2006.01)
- *F02N 15/02* (2006.01)
- *F02N 11/08* (2006.01)
- *H02P 9/04* (2006.01)

(52) U.S. Cl.
USPC ................ 123/179.25; 123/179.3; 123/179.4; 290/38 R

(58) Field of Classification Search
USPC ................ 123/179.3, 179.4, 179.25, 179.28, 123/179.29; 290/38 C, 38 R, 38 E; 701/112, 701/113

See application file for complete search history.

(56) References Cited

U.S. PATENT DOCUMENTS

| | | | |
|---|---|---|---|
| 6,702,718 B2 | 3/2004 | Tani et al. | |
| 2002/0043947 A1* | 4/2002 | Saito et al. | .................... 318/430 |
| 2005/0099009 A1* | 5/2005 | Spellman et al. | ........... 290/38 R |
| 2008/0127927 A1* | 6/2008 | Hirning et al. | ............. 123/179.3 |
| 2010/0251852 A1* | 10/2010 | Murata et al. | ................... 74/7 A |

FOREIGN PATENT DOCUMENTS

| | | |
|---|---|---|
| JP | Y2-56-42437 | 10/1981 |
| JP | A-58-18539 | 2/1983 |
| JP | A-62-085172 | 4/1987 |
| JP | A-5-180130 | 7/1993 |
| JP | A-2000-314364 | 11/2000 |
| JP | A-2002-221059 | 8/2002 |
| JP | A-2003-083212 | 3/2003 |
| JP | A-2003-184715 | 7/2003 |
| JP | A-2005-163737 | 6/2005 |
| JP | A-2005-330813 | 12/2005 |
| JP | A-2009-036057 | 2/2009 |
| JP | A-2009-114626 | 5/2009 |

* cited by examiner

*Primary Examiner* — Stephen K Cronin
*Assistant Examiner* — Sizo Vilakazi
(74) *Attorney, Agent, or Firm* — Oliff & Berridge, PLC

(57) ABSTRACT

In an engine starting system, when a first solenoid is energized at a first timing in response to any one of a turning on of a starter switch and an occurrence of an engine restart request, a solenoid actuator shifts a pinion to a ring gear to be engaged with the ring gear. When a second solenoid is energized, a solenoid switch member energizes a motor. A determiner determines a second timing of energization of the second solenoid after the first timing so that a first delay time from the first timing to the second timing when the first timing is responsive to the turning on of the starter switch is different from a second delay time from the first timing to the second timing when the first timing is responsive to the occurrence of the engine restart request.

13 Claims, 9 Drawing Sheets

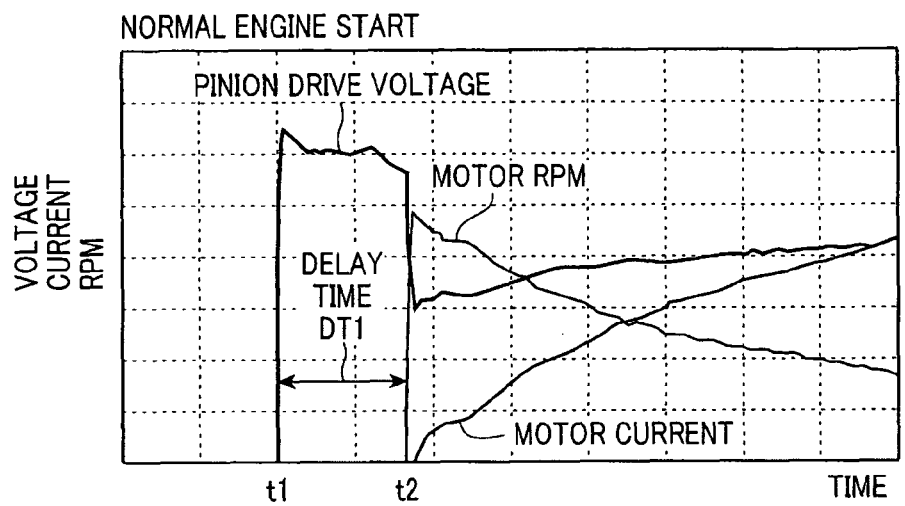
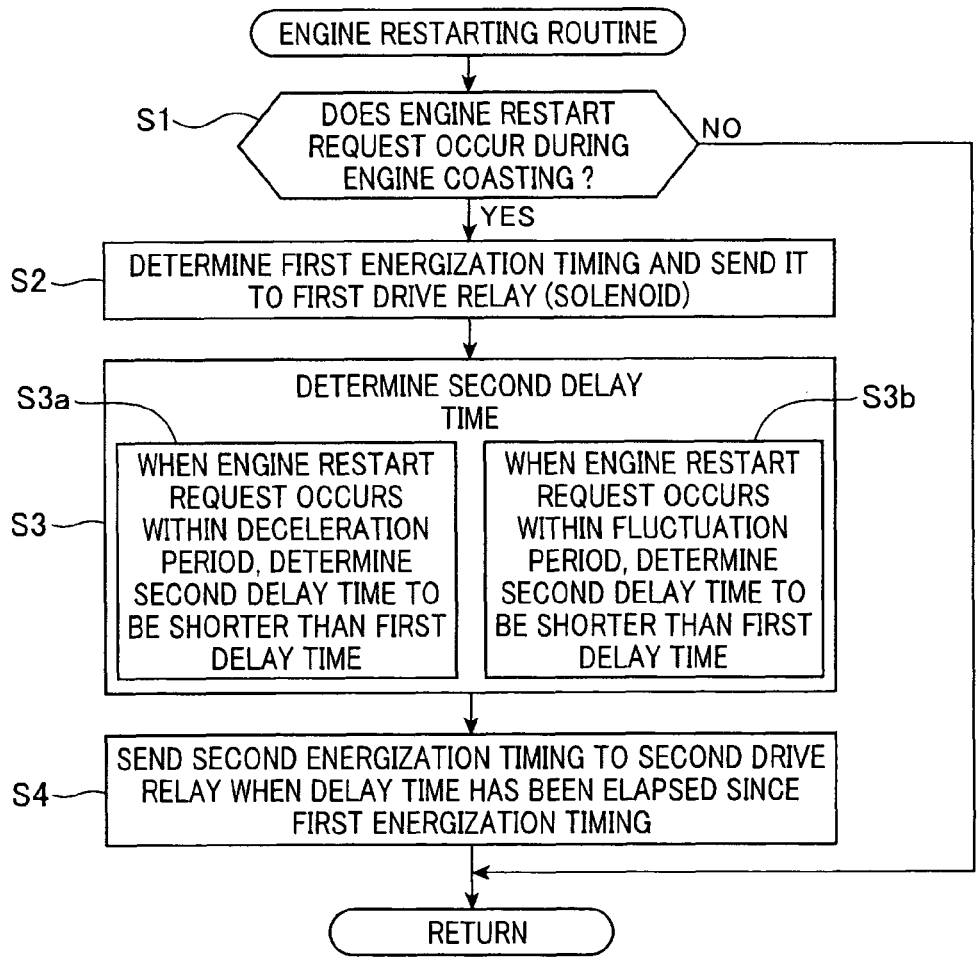

SYSTEM FOR STARTING INTERNAL COMBUSTION ENGINE

CROSS REFERENCE TO RELATED APPLICATIONS

This application is based on Japanese Patent Applications 2009-114626 and 2010-028311 filed on May 11, 2009 and Feb. 11, 2010, respectively. This application claims the benefit of priority from the Japanese Patent Applications, so that the descriptions of which are all incorporated herein by reference.

FIELD OF THE INVENTION

The present invention relates to engine starting systems for starting internal combustion engines. More particularly, the present invention relates to such engine starting systems designed to restart internal combustion engines when an engine restart request occurs after an engine automatic stop task has been applied to the internal combustion engines.

BACKGROUND OF THE INVENTION

One of conventional effective CO2 reduction measures in global warning countermeasures is to install idle reduction systems into motor vehicles. Such an idle reduction system installed in a motor vehicle is designed to shut off fuel injection into an internal combustion engine when the motor vehicle is temporarily stopped at, for example, a light or by a traffic jam, thus automatically stopping the internal combustion engine, referred to simply as "engine".

After the stop of the engine, the idle reduction system is designed to automatically activate a starter when an engine restart request occurs in response to a driver's operation to start the motor vehicle, thus restarting the engine; the driver's operation is, for example, a brake releasing operation, a shift operation of a shift lever to a drive range, or the like. These idle reduction systems reduce the idling state of motor vehicles, resulting in reducing in fuel cost and in exhaust emission.

Conventional starters normally include a solenoid switch. The solenoid switch is designed to magnetically pull a plunger into a solenoid to thereby slidably shift a pinion along an output shaft coupled to a motor so that the pinion is engaged with a ring gear of the engine. The pull-in stroke of the plunger allows a motor-energizing switch (relay) to be turned on so that the pinion is rotated by the motor together with the ring gear, thus cranking the engine. One of the conventional starters is disclosed in Japanese Patent Application Publication NO. H05-180130.

In these starters, in order to smoothly engage the pinion with the ring gear, a large amount of grease as lubricants is put onto slidably contact portions of their parts for shifting the pinion.

However, a higher viscosity of the grease increases the resistance between the slidably contact portions in low-temperature environments, such as cold regions. The increase in the resistance between the slidably contact portions of a starter increases time taken to engage the pinion with the ring gear. In other words, starters have different time taken to engage their pinions with their ring gears from one another depending on their use environments. The time taken to engage the pinion with the ring gear in a starter will be referred to as "pinion-engagement time" hereinafter.

In a motor vehicle equipped with the idle reduction system, frequent engine-automatic stop and restart increases the frequency in use of the starter, resulting in increasing the number of engagements between the pinion and ring gear. For this reason, wear of each of the pinion and ring gear may increase, resulting in change of the friction coefficient of the gear surfaces and change of the shift stroke of the pinion.

Specifically, there is a variation in the pinion-engagement time of starters due to the use environments of the starters. In addition, there is a variation in the pinion-engagement time of starters due to their types.

The variations may cause a variation in the timing when the shifted pinion abuts on the ring gear and a variation in the timing when the pinion is rotated together with the ring gear by torque transferred from the motor among starters due to their use environments and/or their types. The former timing will be referred to as "pinion abutment timing", and the latter timing will be referred to as "pinion rotation timing" hereinafter.

For this reason, conventional starters are each designed to ensure a predetermined temporal difference between the pinion abutment timing and the pinion rotation timing so as to prevent the pinion abutment timing from being earlier than the pinion rotation timing. In other words, conventional starters are each designed to ensure a predetermined temporal difference between the pinion abutment timing and the pinion rotation timing so as to prevent the rotation of the motor together with the ring gear before the abutment of the pinion onto the ring gear. The temporal difference will be referred to as "safety time" hereinafter.

SUMMARY OF THE INVENTION

The inventors have discovered that there are some problems in the conventional starters.

As described above, the conventional starters include a solenoid switch.

The solenoid switch of these conventional starters carries out both the shift of the pinion and the open/close of the switch for energizing/deenergizing the motor.

Specifically, referring to FIG. 11, the solenoid switch of a conventional starter installed in a motor vehicle is comprised of a solenoid 120, a plunger 130, a shift lever 135, a pinion 140, a relay (switch) 150, and a motor 160.

The solenoid 120 is energized by a battery 110 when an ignition key 100 is changed from an ignition position to a start position by the driver so that the plunger 130 is pulled into the solenoid 120 by a predetermined first stroke. The pull-in stroke of the plunger 130 causes the shift lever 135 to pivot about a pivot PI so that the pinion 140 is shifted to a ring gear 170 to abut onto the ring gear 170.

At the pinion abutment timing, a low voltage is applied to the motor 160 so that low torque is generated by the motor 160; this low torque allows the pinion 140 to be slowly rotated to a position where the pinion 140 is engageable with the ring gear 170. This results in that the plunger 130 is further pulled into the solenoid 120 by a predetermined second stroke so that the pinion 140 is meshed with the ring gear 170. At that time, a high voltage is applied to the motor 160 so that high torque is generated by the motor 160; this high torque rotates the pinion 140 together with the ring gear 170 at the pinion rotation timing.

That is, in the conventional starters including the solenoid switch, the safety time between the pinion abutment timing and the pinion rotation timing is fixedly determined according to the second stroke of the plunger 130.

Let us consider an idle reduction system using such a conventional starter including the solenoid switch.

As described above, the shut-off of the fuel injection by the idle reduction system is carried out when the motor vehicle is temporarily stopped. For this reason, starting of the engine after the shut-off thereof is required to be more immediate than starting of the engine in response to the driver's operation of the ignition switch.

Irrespective of the more rapid restart requirements, the safety time determined when the engine is started according to the driver's operation of the ignition switch and that determined when the engine is restarted after the fuel injection has been shut off by the idle reduction system are identical to each other. Thus, the driver may feel that the restart of the engine is slow, resulting in deteriorating the driver's drive feeling.

In view of the circumstances set force above, the present invention seeks to provide starters designed to solve at least one of the problems set forth above.

Specifically, the present invention aims at providing engine starting systems, each of which is designed to improve the engine-restarting response to the occurrence of an engine restart request to thereby meet the more rapid restart requirements.

According to one aspect of the present invention, there is provided an engine starting system for starting an internal combustion engine in response to any one of: a turning on of a starter switch and an occurrence of an engine restart request after an engine automatic stop task has been applied to the internal combustion engine. The internal combustion engine has a first output shaft to which a ring gear is coupled. The engine starting system includes a motor having a second output shaft to which a pinion is coupled and operative to, when energized, rotate the second output shaft. The engine starting system includes a solenoid actuator including a first solenoid and linked to the pinion. The solenoid actuator is configured to, when the first solenoid is energized at a first timing in response to any one of the turning on of the starter switch and the occurrence of the engine restart request, shift the pinion to the ring gear to be engaged with the ring gear. The engine starting system includes a solenoid switch member including a second solenoid and configure to, when the second solenoid is energized, energize the motor. The engine starting system includes a determiner configured to determine a second timing of energization of the second solenoid after the first timing so that a first delay time from the first timing to the second timing when the first timing is responsive to the turning on of the starter switch is different from a second delay time from the first timing to the second timing when the first timing is responsive to the occurrence of the engine restart request.

The engine starting system according to the one aspect of the present invention is designed to individually adjust the first delay time from the first timing to the second timing when the first timing is responsive to the turning on of the starter switch and the second delay time from the first timing to the second timing when the first timing is responsive to the occurrence of the engine restart request. Thus, it is possible to determine the first delay time appropriately for the turning on of the starter switch, and determine the second delay time appropriately for the occurrence of the engine restart request. This results in improving the engine-restarting response to the occurrence of an engine restart request to thereby meet requirements to more rapidly restart the internal combustion engine after the engine automatic stop task has been applied thereto.

According to an alternative aspect of the present invention, there is provided an engine starting system for starting an internal combustion engine in response to any one of: a turning on of a starter switch and an occurrence of an engine restart request after an engine automatic stop task has been applied to the internal combustion engine. The internal combustion engine has a first output shaft to which a ring gear is coupled. The engine starting system includes a motor having a second output shaft to which a pinion is coupled and operative to, when energized, rotate the second output shaft, and a solenoid actuator including a first solenoid and linked to the pinion, the solenoid actuator being configured to, when the first solenoid is energized at a first timing in response to any one of the turning on of the starter switch and the occurrence of the engine restart request, shift the pinion to the ring gear to be engaged with the ring gear. The engine starting system includes a solenoid switch member including a second solenoid and configure to, when the second solenoid is energized at a second timing, energize the motor, and a sensor operative to directly or indirectly measure a rotational speed of the first output shaft of the internal combustion engine. The engine starting system includes a controller configured to variably control, according to the rotational speed of the first output shaft of the internal combustion engine measured by the sensor, a delay time from the first timing to the second timing when the first timing is responsive to the occurrence of the engine restart request.

The configuration of the engine starting system according to the alternative aspect of the present invention makes possible to determine the delay time appropriately for the occurrence of the engine restart request. This results in improving the engine-restarting response to the occurrence of an engine restart request to thereby meet requirements to more rapidly restart the internal combustion engine after the engine automatic stop task has been applied thereto.

The configuration of the engine starting system according to the alternative aspect of the present invention also makes possible to determine the second delay time appropriately for the measured rotational speed of the first output shaft of the internal combustion engine at the occurrence of an engine restart request.

BRIEF DESCRIPTION OF THE DRAWINGS

Other objects and aspects of the invention will become apparent from the following description of embodiments with reference to the accompanying drawings in which:

FIG. 3 is a graph schematically illustrating, versus time, each of pinion drive voltage, motor current, and motor RPM in the starter for normally starting an internal combustion engine illustrated in FIG. 2;

FIG. 4 is a flowchart schematically illustrating an engine restarting routine to be executed by an ECU illustrated in FIG. 2 according to the first embodiment;

DETAILED DESCRIPTION OF EMBODIMENTS OF THE INVENTION

Figure 1:
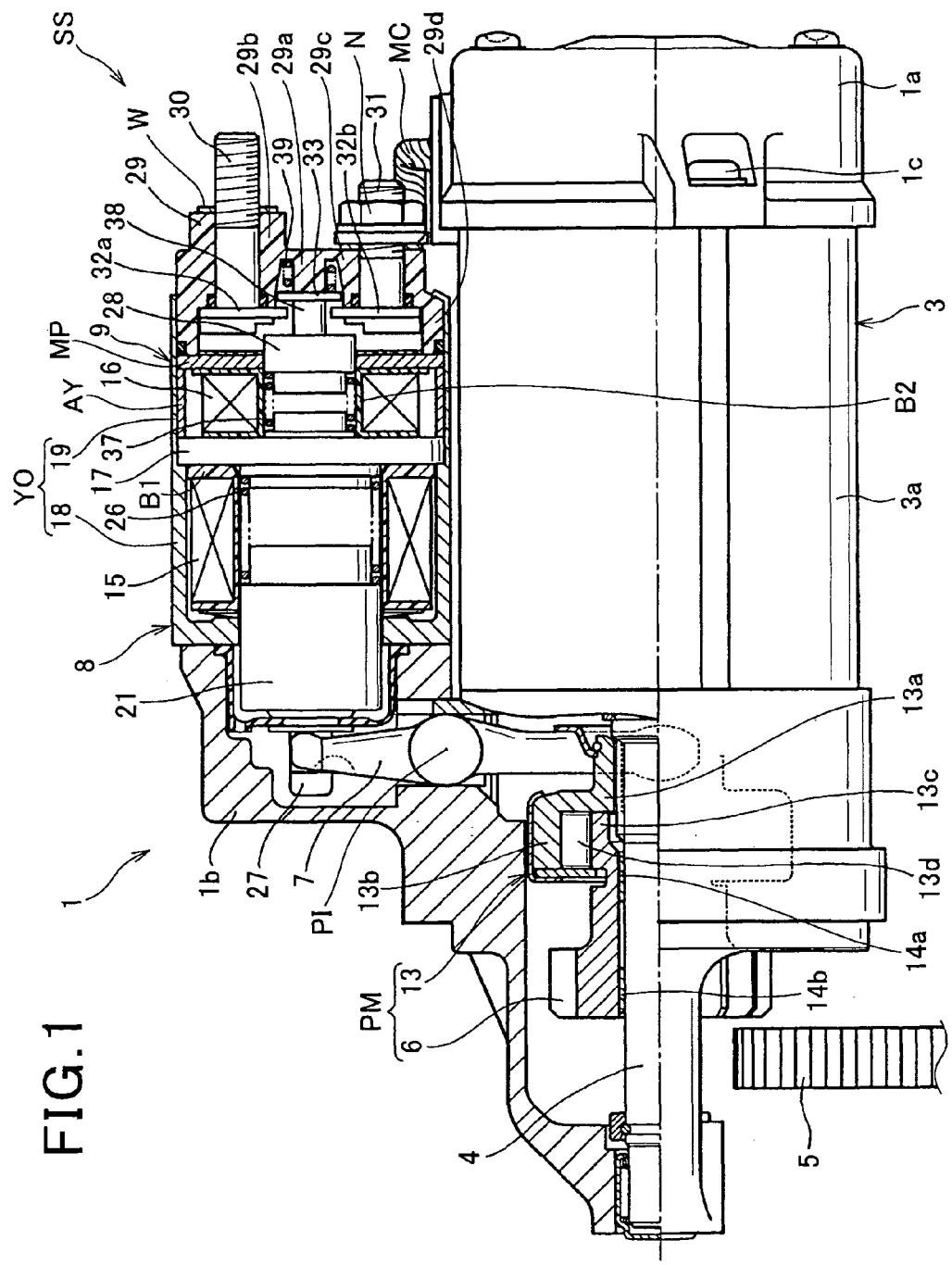
FIG. 1 is a partially axial cross sectional view of a starter according to the first embodiment of the present invention.

Embodiments of the present invention will be described hereinafter with reference to the accompanying drawings.

In the embodiments, like parts between the embodiments, to which like reference characters are assigned, are omitted or simplified in redundant description.

First Embodiment

Referring to FIGS. 1 to 6, an engine starting system SS according to the first embodiment of the present invention is installed in, for example, an engine room of a motor vehicle. The engine starting system SS works as an idle reduction system to automatically stop an internal combustion engine (referred to as "engine") EN and restart the engine EN.

The engine starting system SS includes a starter 1 used to start the engine EN, and an electronic control unit (ECU) 2 for control of operations of the starter 1 at the start of the engine EN. The engine starting system SS also includes a first drive relay 23, a battery 25, a second drive relay 35, a delay circuit 36, a first diode 40, and a second diode 41.

Referring to FIG. 1, the starter 1 includes a front housing (front frame) 1*a*, an end housing (end frame) 1*b*, a motor 3, an output shaft 4, an electromagnetic (solenoid) actuator 8 having a shift lever 7, and a motor-energizing switch 9.

Figure 2:
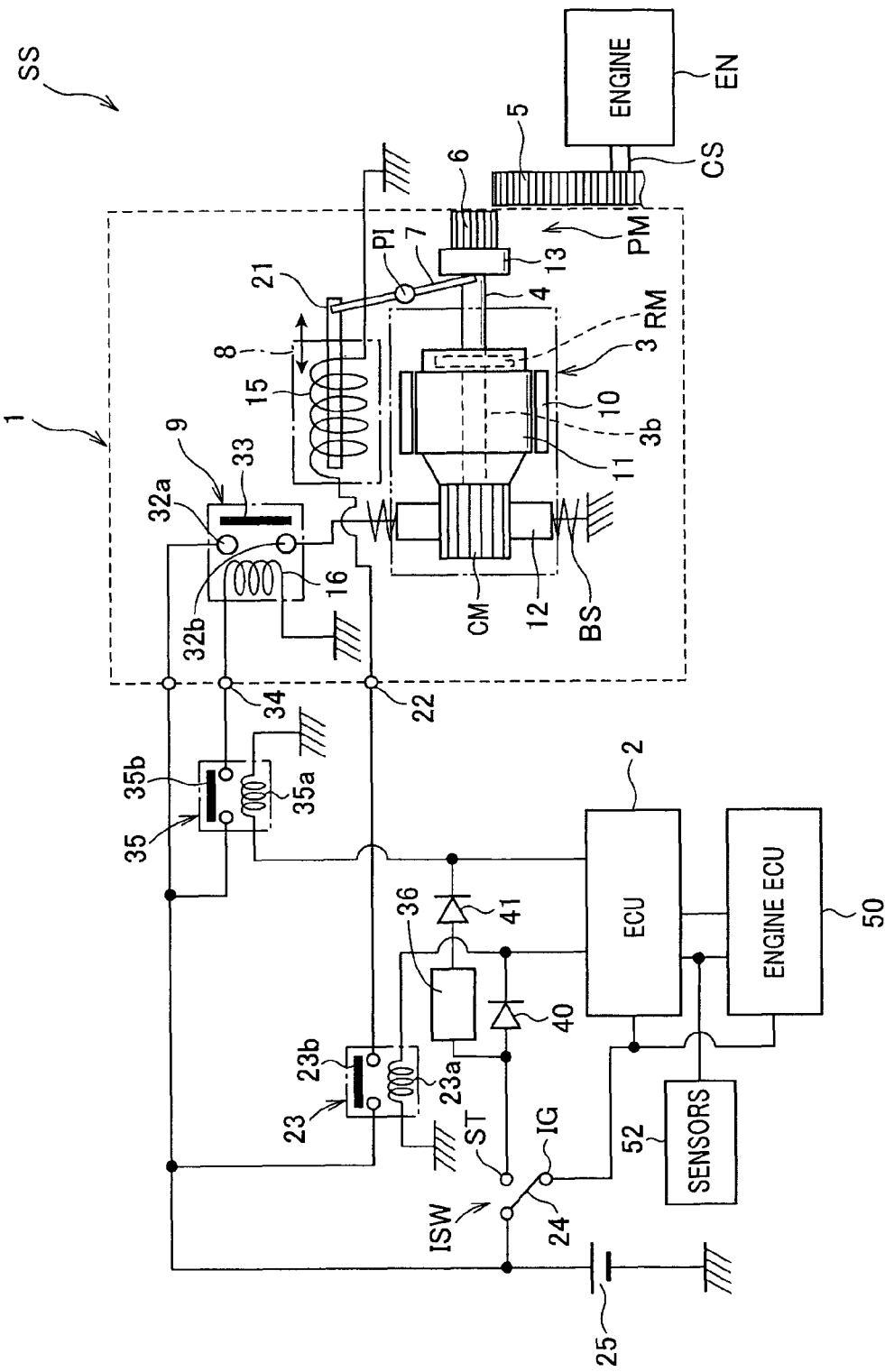
FIG. 2 is an electrical circuit diagram of an engine starting system according to the first embodiment.
Figure 5:
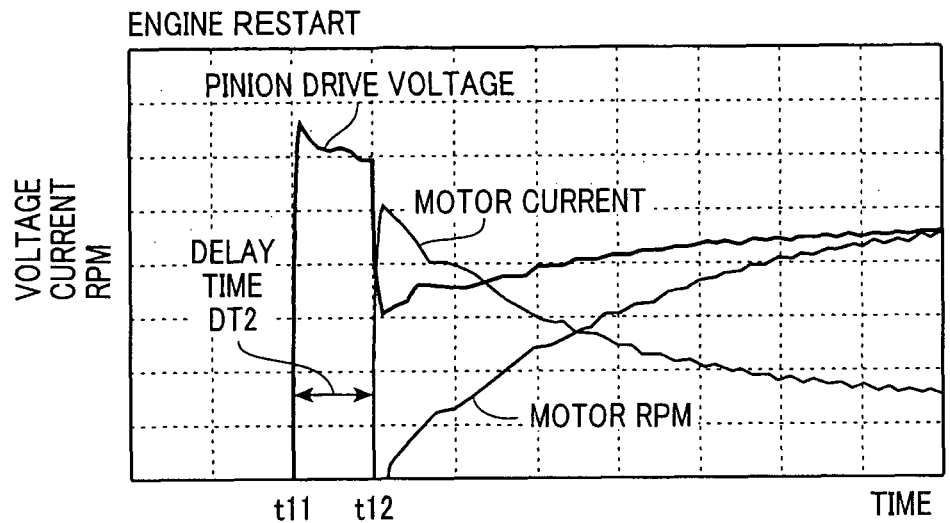
FIG. 5 is an example of a graph schematically illustrating, versus time, each of pinion drive voltage, motor current, and motor RPM in the starter for restarting the internal combustion engine according to the first embodiment.
Figure 6:
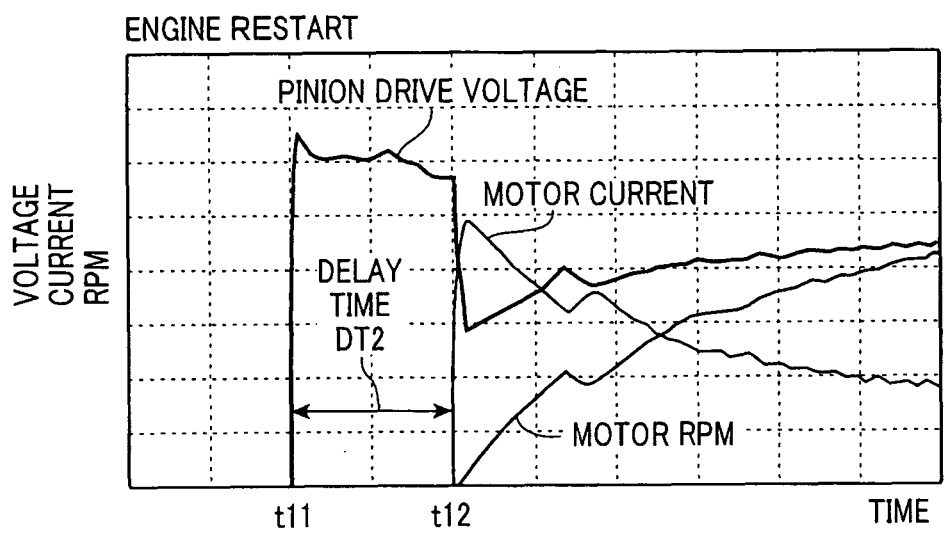
FIG. 6 is another example of a graph schematically illustrating, versus time, each of pinion drive voltage, motor current, and motor RPM in the starter for restarting the internal combustion engine according to the first embodiment.

Referring to FIGS. 1 and 2, the motor 3 includes an outer annular yoke 3*a* fastened from both axial ends by the front and end housings 1*a* and 1*b* with through bolts 1*c*. The front and end housings 1*a* and 1*b* and the yoke 3*a* of the motor 3 constitute the housing of the motor 3 (starter 1).

In addition, the motor 3 includes a plurality of field members 10, such as a plurality of permanent magnets, located inside the yoke 3*a* so that the yoke 3*a* prevents magnetic force of the permanent magnets from leaking out of the yoke 3*a*. The motor 3 includes an output shaft 3*b* and an annular armature (rotor) 11 located inside the field members 10 with gaps therebetween; this output shaft 3*b* has an outer circumferential surface on which the armature 11 is mounted.

The annular armature 11 is provided at its one axial end with an annular commutator CM consisting of a plurality of commutator segments. For example, the annular armature 11 consists of a plurality of armature coils electrically connected to the plurality of commutator segments 10, respectively.

The motor 3 includes, for example, a pair of brushes 12 urged by a pair of brush springs BS so that each of the brushes 12 is brought into constant abutment with at least one of the plurality of commutator segments.

When electric power is applied across the brushes 12, the brushes 12 and the plurality of commutator segments provide a current in at least some of the plurality of armature coils so that each of the plurality of armature coils creates a magnetic field whose magnetic polarity is alternatively changed. The generated magnetic field of the armature 11 and the magnetic fields generated by the field members 10 create torque that rotates the armature 11 relative to the field members 10 to thereby rotate the output shaft 3*b*.

The starter 1 also includes a reduction mechanism RM coaxially mounted on one end of the output shaft 3*b*. The reduction mechanism RM is designed to transfer the torque of the output shaft 3*b* while reducing the rotational speed of the output shaft 3*b*, thus increasing the torque that rotates the output shaft 4.

For example, as the reduction mechanism RM, a planetary-gearset mechanism is used. The planetary-gearset mechanism RM consists of, for example, a central sun gear mounted on the one end of the output shaft 3*b*, an annular internal gear, two or more planet gears that surround the central sun gear, and a planetary carrier having an internal gear with which the planet gears are, in turn, meshed; this planetary carrier is integrally mounted on the output shaft 4.

The planetary-gearset mechanism RM is configured to convert the rotation of the central sun gear into the rotation of each of the planet gears around the central sun gear, thus rotating the planetary carrier together with the output shaft 4 while increasing the torque of the output shaft 4 as compared with that of the output shaft 3*b*.

The starter 1 includes a movable pinion member PM consisting of a clutch 13 and a pinion 6.

As illustrated in FIG. 1, the clutch 13 is made up of a cylindrical spline barrel 13*a*, an annular clutch outer 13*b*, a cylindrical clutch inner 13*c*, rollers 13*d*, bearings 14*a*, and roller springs (not shown).

The spline barrel 13*a* is mounted in helical-spline fit on the outer surface of the output shaft 4 to be axially shiftable and rotatable together with the output shaft 4. The clutch outer 13*b* has a diameter greater than that of the spline barrel 13*a* and extends from the spline barrel 13*a*.

The clutch inner 13*c* is mounted on the outer circumference of the output shaft 4 in opposite to the clutch outer 13*b* to be rotatable and axially shiftable via the bearings 14*a*. The spline barrel 13*a* forms a plurality of cam chambers between the inner circumference thereof and the outer circumference of the clutch inner 13*c*, and a plurality of spring chambers communicating with the plurality of cam chambers, respectively; the plurality of rollers 13*d* are installed in the plurality of chambers, respectively.

Each of the cam chambers has, for example, a substantially wedged shape in its circumferential direction so that one circumferential end thereof is narrower than the other circumferential end thereof. Each of the plurality of springs is located in a corresponding one of the plurality of spring chambers such that a corresponding one of the plurality of rollers 13*d* is urged toward the narrower end of a corresponding one of the plurality of cam chambers.

The clutch inner 13*c* extends in the axial direction of the output shaft 4 away from the motor 3 to form a cylindrical inner tube with an outer circumferential on which the pinion 6 is mounted in spline fit. This allows the pinion 6 to be shiftable in the axial direction of the output shaft 4 together with the clutch inner 13*c* and rotatable therewith via bearings 14*b*.

The clutch 13 is designed as a one-way clutch operative to transfer rotational motion supplied from the clutch outer 13*b* (the motor 3) to the clutch inner 13*c* (pinion 6) via the plurality of rollers 13*d* without transferring rotational motion supplied from the clutch inner 13*c* (pinion 6) to the clutch outer 13*b* (motor 3).

The solenoid actuator 8 is operative to actuate the shift lever 7 to thereby shift the movable pinion member PM in the axial direction of the output shaft 4. The motor-energizing switch 9 is operative to select energization and deenergization of the motor 3.

Referring to FIG. 1, the solenoid actuator 8 and the motor-energizing switch 9 according to the first embodiment are comprised of a first solenoid 15 and a second solenoid 16 that work as electromagnets when energized, respectively. The solenoid actuator 8 and the motor-energizing switch 9 are arranged such that the first and second solenoids 15 and 16 are coaxially aligned in parallel to the axial direction of the motor 3.

In addition, the solenoid actuator 8 and the motor-energizing switch 9 share a fixed core 17 located between the first and second solenoids 15 and 16. The solenoid actuator 8 and the motor-energizing switch 9 also share a hollow cylindrical yoke assembly YO comprised of a first hollow cylindrical yoke (solenoid yoke) 18 that serves as a case of the solenoid actuator 8, and of a second hollow cylindrical yoke (switch yoke) 19 that serves as a case of the motor-energizing switch 9; these solenoid and switch yokes 18 and 19 are continuously formed in their same axial direction parallel to the axial direction of the motor 3.

Specifically, the solenoid actuator 8 and the motor-energizing switch 9 are so aligned in their same axial direction as to be integrally formed as a switch assembly. The switch assembly (solenoid actuator 8 and the motor-energizing switch 9) is so arranged in parallel to the axial direction of the motor 3.

The yoke assembly YO (solenoid yoke 18) has one annular end (bottom) close to the front housing 1a of the starter 1, and the yoke assembly YO (switch yoke 19) has one opening end opposite to the bottom.

Referring to FIG. 1, one part of the outer circumferential end of the front housing 1a outwardly extends in a radial direction of the motor 3. The bottom of the yoke assembly YO is fastened at its outer peripheral portion to the front housing 1a by a pair of stud bolts (not shown). The yoke assembly YO has a constant outer diameter in its axial direction, and the solenoid yoke 18 has an inner diameter smaller than an inner diameter of the switch yoke 19 so that the solenoid yoke 18 is greater in wall thickness than the switch yoke 19. That is, the yoke assembly YO has an inner shoulder (stepped shoulder) at the boundary between the solenoid yoke 18 and the switch yoke 19.

The fixed core 17 has a substantially circular plate-like shape. An edge of one circular surface of the fixed core 17 is seated on the inner shoulder of the yoke assembly YO so that the fixed core 17 is positioned in the axial direction of the yoke assembly YO.

First, the structure of the solenoid actuator 8 according to the first embodiment will be described hereinafter.

Referring to FIG. 1, the solenoid actuator 8 includes the solenoid yoke 18, a resin bobbin 131, the first solenoid 15, a substantially inner hollow cylindrical plunger 21, the fixed core 17, a return spring 26, a rod joint 27, a drive spring (not shown), and a first switch terminal 22 (see FIG. 2) for external connection.

The bobbin B1 has a cylindrical tubular shape with first and second flanges at their respective axial ends. The bobbin B1 is so installed in the solenoid yoke 18 as to be coaxially mounted at its first flange on the axial bottom of the solenoid yoke 18 and at its second flange on the one outer surface of the edge of the fixed core 17. The first solenoid 15 is wound around the outer wall surface of the bobbin B1.

The fixed core 17 is formed at its circular center portion of the one circular surface with a first base continuously extending therefrom with a first diameter; this first base coaxially projects into the bobbin 131 toward the bottom of the yoke assembly YO. The fixed core 17 is also formed at the circular end surface of the first base with a second base continuously extending therefrom with a second diameter shorter than the first diameter of the first base. The second base coaxially projects toward the bottom of the yoke assembly YO so as to provide a first annular space therearound with respect to the inner wall surface of the bobbin B1. The second flange of the bobbin B1 is fitted around the outer circumference of the first base of the fixed core 17.

The plunger 21 has a substantially cylindrical shape, and is formed at its one end with a mounting boss; this one end faces the fixed core 17. The plunger 21 is slidably installed in the inner hollow portion of the bobbin B1 such that: its mounting boss faces the fixed core 17; and the other end projects through an opening end of the bobbin B1 around the first flange and the inner circumference of the annular bottom of the solenoid yoke 18. The mounting boss of the plunger 21 is formed with a second annular space therearound with respect to the inner wall surface of the bobbin B1.

The return spring 26 is coaxially installed in the bobbin B1 such that both axial ends thereof are fitted in the first and second annular spaces, respectively. The plunger 21 is biased by the return spring 26 toward a direction opposite to the fixed core 17.

One end of the first solenoid 15 is electrically connected to the first terminal 22 (see FIG. 2), and the other end is joined to, for example, the fixed core 17 by, for example, welding so as to be grounded. The first terminal 22 is, for example, provided to outwardly project through a resin cover described later. To the first terminal 22, wiring is electrically connected; this wiring is electrically connected to the first drive relay 23.

The plunger 21 is formed therein with a substantially cylindrical hole whose bottom is the mounting boss. The rod joint 27 has a substantially cylindrical shape, at its one end with a groove, and at its other end with a flange. The rod joint 27 is installed in the hole of the plunger 21 such that: the one end projects from the opening end of the cylindrical hole of the plunger 21, and the flange is in contact with the bottom (mounting boss) of the plunger 21.

A stopper (not shown) is designed as, for example, a substantially tubular elastic member, and is mounted around one end of the projecting portion of the rod joint 27; this one end is close to the opening end of the plunger 21. The shift lever 7 has one end and the other end in its length direction. The one end of the shift lever 7 is pivotally linked to the groove of the rod joint 27. The drive spring is so installed in the cylindrical hole of the plunger 21 and around the rod joint 27 as to be limited in elasticity between the stopper and the flange of the rod joint 27. This configuration biases the rod joint 27 toward the bottom (mounting boss) of the plunger 21.

The other end of the shift lever 7 is pivotally coupled to the movable pinion member PM. The shift lever 7 is pivoted about a pivot PI located at its substantially center in the length direction.

When the plunger 21 is shifted in the axial direction of the bobbin B1 in parallel to the axial direction of the motor 3, the shift lever 7 is pivoted so that the movable pinion member PM is shifted in the axial direction of the output shaft 4. The engine EN is placed such that the shift of the movable pinion member PM allows the pinion 6 to be engaged with a ring gear 5 directly or indirectly coupled to a crankshaft (output shaft) CS of the engine EN.

In the structure of the solenoid actuator 8, when the first solenoid 15 is energized, a magnetic flux is created through a first magnetic circuit consisting of the solenoid yoke 18, the plunger 21, and the fixed core 17. This magnetizes the fixed core 17 so that the plunger 21 is pulled into the first solenoid 15 together with the rod joint 27 against the elastic force of the return spring 26.

When the first solenoid 15 is deenergized, the plunger 21 is returned from the first solenoid 15 by the elastic force of the return spring 26 up to an original position illustrated in FIG. 1.

Next, the structure of the motor-energizing switch 9 according to the first embodiment will be described hereinafter.

Referring to FIG. 1, the motor-energizing switch 9 includes the switch yoke 19, a hollow cylindrical auxiliary yoke AY, the fixed core 17, a resin bobbin B2, the second solenoid 16, a movable core 28, a rod 38, a magnetic plate MP, a return spring 37, a pair of stationary contacts 32a and 32b, a movable contact 33, a B terminal bolt 30, an M terminal bolt 31, a contact-pressure spring 39, a resin cover 29, and a second terminal 34 for external connection.

The bobbin B2 has a cylindrical tubular shape with first and second flanges at their respective axial ends. The bobbin B2 is so installed in the switch yoke 19 as to be coaxially mounted at its first flange on the other outer surface of the edge of the fixed core 17. The second solenoid 16 is wound around the outer wall surface of the bobbin B2.

The auxiliary yoke AY is so located around the second solenoid 16 with an annular clearance therebetween as to be mounted on the inner circumference of the second yoke 19 and on the magnetic plate MP. That is, the auxiliary yoke AY is axially positioned on the magnetic plate MP.

The fixed core 17 is formed at its circular center portion of the other circular surface with a third base continuously extending therefrom with a third diameter; this third base coaxially projects into the bobbin B2 toward the opening end of the yoke assembly YO. The fixed core 17 is also formed at the circular end surface of the third base with a fourth base continuously extending therefrom with a fourth diameter shorter than the third diameter of the third base. The fourth base coaxially projects toward the opening end of yoke assembly YO so as to provide a second annular space therearound with respect to the inner wall surface of the bobbin B2. The first flange of the bobbin B2 is fitted around the outer circumference of the third base of the fixed core 17.

The magnetic plate MP having a substantially annular shape with a central circular through hole is coaxially mounted at its one outer annular surface on the second flange of the bobbin B2 and on the auxiliary yoke AY. That is, the magnetic plate MP is axially positioned on the auxiliary yoke AY.

The movable core 28 has a substantially cylindrical shape, and is formed at its one end with a mounting boss. The movable core 28 is slidably installed in the inner hollow portion of the bobbin 132 and the circular through hole of the magnetic plate MP such that:

its one end (mounting boss) coaxially faces the fourth base of the fixed core 17 with a space therebetween; and the other end projects through the circular through hole of the magnetic plate MP.

The mounting boss of the movable core 28 is formed with a second annular space therearound with respect to the inner wall surface of the bobbin B2. The return spring 37 is coaxially installed in the bobbin B2 such that both axial ends thereof are fitted in the first and second annular spaces, respectively. The movable core 28 is biased by the return spring 37 toward a direction opposite to the fixed core 17.

One end of the second solenoid 16 is electrically connected to the second terminal 34 (see FIG. 2), and the other end is joined to, for example, the fixed core 17 by, for example, welding so as to be grounded. The second terminal 34 is, for example, provided to outwardly project through the resin cover 29. To the second terminal 34, wiring is electrically connected; this wiring is electrically connected to the second drive relay 35.

The movable core 28 is formed therein with a substantially cylindrical hole whose bottom is the mounting boss thereof.

The rod 38 has a substantially cylindrical shape, one end of which is fitted in the cylindrical hole of the movable core 28.

The resin cover 29 has a substantially inner hollow cylindrical shape, and has one opening end and the other end (bottom). The resin cover 29 is, for example, fitted in the other opening end of the switch yoke 19 so as to cover the other opening end thereof. The cover 29, the yoke assembly YO, the front housing 1a, and the end housing 1b constitute a housing assembly of the starter 1.

An inner surface of the bottom of the resin cover 29 is formed at its center with a cylindrical mounting boss 29a axially extending toward the other end of the rod 38 by a first preset length and coaxially facing it. The inner surface of the bottom of the resin cover 29 is also fat Hied with a pair of tubular bolt guides 29b and 29c at both sides of the cylindrical mounting boss 40a. Each of the tubular bolt guides 29b and 29c axially extends toward the magnetic plate MP by a second preset length greater than the first preset length. An outer surface of the bottom of the resin cover 29, which corresponds to the tubular bolt guide 29b, extends by a preset length in a direction opposite to the direction of the magnetic plate MP; this extending portion corresponds to a part of the tubular bolt guide 29b.

The one opening end 29d of the resin cover 29, which serves as a part of each of the bolts guides 29b and 29c, axially projects in a direction opposite to the bottom of the resin cover 29. This projecting opening end 29d is so fitted in the other opening end of the switch yoke 19 as to be mounted on the other annular surface of the magnetic plate MP. This results in that the resin cover 29 is axially positioned on the magnetic plate MP. The projecting opening end 29d is provided with a recess formed in its outer circumference. The resin cover 29 is fixedly attached to the yoke assembly YO by crimping the other opening end of the switch yoke 19 into the recess.

The movable contact 33 has a plate-like shape and is made of a conductive material, such as iron and copper. The movable contact 33 is supported on the other end of the rod 38.

The B terminal bolt 30 is electrically connected to a highside terminal of the battery 25; a low-side terminal thereof is grounded. The B terminal bolt 30 has a head portion and a threaded portion. The B terminal bolt 30 is inserted in the bolt guide 29b from the inner side of the resin cover 29 such that the almost of the threaded portion projects from the bolt guide 29b.

The stationary contact 32a having a substantially annular plate-like shape is fitted around the outer circumference of one end of the head portion of the B terminal bolt 30 so that the stationary contact 32a is electrically and mechanically connected to the B terminal bolt 30 and is located to face the movable contact 33 and the movable core 28.

The M terminal bolt 31 is electrically connected to one of the blushes 12 of the motor 3; the other of the brushes 12 is grounded. The M terminal bolt 31 has a head portion and a threaded portion. The M terminal bolt 31 is inserted in the tubular bolt guide 29c from the inner side of the resin cover 29 such that the almost of the threaded portion projects from the tubular bolt guide 29c.

The stationary contact 32b having a substantially annular plate-like shape is fitted around the outer circumference of one end of the head portion of the M terminal bolt 31 so that the stationary contact 32b is electrically and mechanically connected to the M terminal bolt 31 via a motor cable MC and is located to face the movable contact 33 and the movable core 28.

Note that the stationary contact 32a and the B terminal bolt 30 can be individually produced and integrated with each other, or integrally produced. Similarly, the stationary contact 32b and the M terminal bolt 31 can be individually produced and integrated with each other, or integrally produced.

The first preset length of the mounting boss 29a and the second preset length of each of the tubular bolt guides 29b and 29c are determined such that each of the stationary contacts 32a and 32b is spaced apart from the movable contact 33 being seated on the mounting boss 29a toward the movable core 28.

The contact-pressure spring 39 is so wound around the outer surface of the mounting boss 29a as to bias the movable contact 33 being seated on the mounting boss 29a toward the movable core 28.

In the first embodiment, an initial load of the return spring 37 is greater than that of the contact-pressure spring 39. Thus, while the motor-energizing switch 9 is deenergized, the movable contact 33 is seated on the cylindrical mounting boss 29a by the biasing force of the return spring 37 with the contact-pressure spring 39 being compressed.

The starter 1 includes a crimp washer W and a nut N. The crimp washer W is fitted around the projecting upper part of the threaded portion of the B terminal bolt 30 to be crimped thereto, and the nut N (see FIG. 1) is fitted around the projecting upper part of the threaded portion of the M terminal bolt 31 to be fastened thereto. This results in that the mount plate 55 is fixedly mounted on the resin cover 40.

In the structure of the motor-energizing switch 9, when the second solenoid 16 is energized, a magnetic flux is created through a second magnetic circuit consisting of the switch yoke 19, the auxiliary yoke AY, the fixed core 17, the magnetic plate MP, and the movable core 28 so that the fixed core 17 is magnetized. This allows the movable core 28 to be pulled into the second solenoid 16 against the elastic force of the return spring 37 so that the rod 38 is shifted toward the fixed core 17 together with the movable core 28. Because the movable contact 33 is biased by the compressed contact-pressure spring 39 toward the movable core 28, the movable contact 33 is shifted toward the movable core 28 together with the shift of the rod 38 toward the core body 17.

When the rod 38 is shifted so that the movable contact 33 is abutted onto the stationary contacts 32a and 32b by a preset pressure based on the elastic force of the contact-pressure spring 39, the stationary contacts 32a and 32b are electrically connected to each other. This electrical conduction between the stationary contacts 32a and 32b allows the voltage of the battery 25 to be applied to the motor 3 through the brushes 12 and the commutator segments CM.

When the second solenoid 19 is deenergized, the movable core 28 is returned by the elastic force of the return spring 37 toward the bottom of the resin cover 29 together with the rod 38. After the rod 38 is in contact with the movable contact 33, the rod 38 and the movable contact 33 are integrally shifted toward the mounting boss 29a against the spring force of the contact-pressure spring 39 so that the movable contact 33 is separated from the stationary contacts 32a and 32b. This electrically disconnects the stationary contacts 32a and 32b from each other. Thereafter, the movable contact 33 is seated on the mounting boss 29a by the elastic force of the return spring 37 with the contact-pressure spring 39 being compressed as an original position illustrated in FIG. 1.

Note that, in the starter 1, in order to smoothly engage the pinion 6 with the ring gear 5, a large amount of grease as lubricants is put onto slidably contact portions of some parts of the starter 1; these parts include the output shaft 4, the helical-spline fit portions, and the cam chambers.

The first drive relay 23 is comprised of, for example, a solenoid 23a and a switch 23b. As the first drive relay 23, a semiconductor relay can be used.

One end of the solenoid 23a is electrically connected to the ECU 2 and to an ignition switch ISW through the first diode 40, and the other end is grounded. The ignition switch ISW is provided in the motor vehicle, and is comprised of a driver operable ignition key 24, an ignition-ON contact (position) 1G electrically connected to the ECU 2, and a starter-ON contact (position) ST electrically connected to the first diode 40. The ignition switch ISW is electrically connected to the positive terminal of the battery 25.

When the ignition key 24 is inserted by the driver in a key cylinder of the motor vehicle and operated by the driver to the ignition-ON position 1G, electric power of the battery 25 is supplied to the ECU 2 so that the ECU 2 is activated.

When the ignition key 24 inserted in the key cylinder is turned by the driver from the ignition-ON position IG to the starter-ON position ST, electric power of the battery 25 is supplied to the solenoid 23a via the first diode 40 as an engine starting signal so that the solenoid 23a is energized.

In addition, when an electric ON signal is supplied from the ECU 2 to the solenoid 23a, the solenoid 23a is energized.

The switch 23b is electrically connected between the positive terminal of the battery 25 and the first terminal 22 of the solenoid actuator 8. The switch 23b is turned on (closed) by magnetic force generated when the solenoid 23a is energized so that the first solenoid 15 is energized.

The second drive relay 35 is comprised of, for example, a solenoid 35a and a switch 35b. As the second drive relay 35, a semiconductor relay can be used.

One end of the solenoid 35a is electrically connected to the ECU 2 and to the starter-ON position ST of the ignition switch ISW through the second diode 41 and the delay circuit 36, and the other end is grounded.

When the ignition key 24 inserted in the key cylinder is turned by the driver from the ignition-ON position IG to the starter-ON position ST, electric power of the battery 25 is supplied to the delay circuit 36 as the engine starting signal so that the output of the electric power from the delay circuit 36 is delayed by a preset first delay time DT1. After the preset first delay time DT1 has elapsed since the operation of the ignition key 24 from the ignition-ON position IG to the starter ON position, the electric power is outputted from the delay circuit 36 so that the electric power is supplied to the solenoid 35a via the second diode 41, resulting in that the solenoid 35a is energized.

In addition, when an electric ON signal is supplied from the ECU 2 to the solenoid 35a, the solenoid 35a is energized.

The switch 35b is electrically connected between the positive terminal of the battery 25 and the second terminal 34 of the motor-energizing switch 9. The switch 35b is turned on (closed) by magnetic force generated when the solenoid 35a is energized so that the second solenoid 16 is energized.

The ECU 2 is communicably connected to an engine ECU 50 installed in the motor vehicle and operative to control the engine EN.

To the ECU 2 and the engine ECU 50, for example, a signal indicative of a rotational speed of the crankshaft CS of the engine EN, a signal indicative of the shift position of a shift lever (transmission lever) of the motor vehicle, a signal indicative of ON or OFF position of a brake switch of the motor vehicle, and another signal associated with the operating conditions of the engine are repetitively inputted from sensors 52 installed in the motor vehicle. For example, the sensors 52 include a sensor operative to directly or indirectly measure the rotational speed of the crankshaft CS of the engine EN (engine RPM) and to output a signal indicative of the rotational speed of the crankshaft CS of the engine EN to each of the ECU 2 and the engine ECU 50.

Based on the signals, the engine ECU 50 performs various engine-control tasks.

The various engine-control tasks include: a task for automatically shutting off the fuel injection into the engine EN, a task for restarting the fuel injection into each cylinder of the engine EN with the fuel injection thereinto being shut off, a task for controlling a fuel injection quantity and a fuel injection timing for each cylinder of the engine EN, a task for controlling an ignition timing for each cylinder of the engine EN, a task for controlling an idle speed of the engine EN, and the like.

Based on the signals, the ECU 2 determines whether at least one of predetermined engine automatic stop conditions is met.

Upon determining that at least one of the predetermined engine automatic stop conditions is met, the ECU 2 sends an engine automatic stop instruction to the engine ECU 50. In response to the engine automatic stop instruction, the engine ECU 50 carries out an engine automatic stop task. The engine automatic stop task is, for example, to shut off the fuel injection into each cylinder of the engine EN.

The predetermined engine automatic stop conditions include, for example, the following conditions that the shift position of the shift lever of the motor vehicle is set to a neutral position, the brake switch of the motor vehicle is set to the ON position (the driver depresses a brake pedal of the motor vehicle), or the engine speed is equal to or lower than a preset speed (idle-reduction execution speed).

During execution of the automatic engine stop task, when determining that at least one of predetermined engine restart requests occurs based on the signals inputted to the ECU 2, the ECU 2 sends an engine restart instruction to the engine ECU 50, and individually sends, to each of the first and second drive relays 23 and 35, the electric ON signal. In response to the engine restart instruction, the engine ECU 50 restarts the fuel injection into each cylinder of the engine EN.

The predetermined engine restart requests can occur when the shift position of the shift lever is set to a drive position, or the brake switch is set to the OFF position (the driver releases the depression of the brake pedal of the motor vehicle).

These operations of the ECU 2 and the engine ECU 50 restart the engine EN.

In the first embodiment, the timing at which the first solenoid 15 of the solenoid actuator 8 should be energized based on the electric power supplied through the first drive relay 23 is defined as first energization timing. Similarly, the timing at which the second solenoid 16 of the motor-energizing switch 9 should be energized based on the electric power supplied through the second drive relay 35 is defined as second energization timing.

The ECU 2 according to the first embodiment is designed to determine the first energization timing and the second energization timing based on the rotational speed of the crankshaft CS of the engine EN, and send, to the first and second drive starters 23 and 35, the electric ON signals according to the determined first energization timing and the second energization timing, respectively.

Next, operations of the engine starting system SS will be described hereinafter.

First, operations of the engine starting system SS to start the engine EN in response to the driver's operation of the ignition key 24 during the engine EN being stopped (the vehicle being parked) will be described. In other words, operations of the engine starting system SS in order to normally start the engine EN in response to the driver's operation of the ignition key 24 will be described.

When the ignition key 24 inserted in the key cylinder is turned by the driver from the ignition-ON position 1G to the starter-ON position ST, electric power (engine start signal) of the battery 25 is supplied to the solenoid 23a via the first diode 40 so that the solenoid 23a is energized. The energization of the solenoid 23a turns on the switch 23b so that the first solenoid 15 is energized based on the electric power of the battery 25 at the first energization timing t1.

The energized first solenoid 15 creates a magnetic flux that magnetizes the fixed core 17. This allows the plunger 21 to be pulled into the first solenoid 15 toward the fixed core 17 together with the rod joint 27 against the elastic force of the return spring 26.

The shift of the rod joint 27 toward the fixed core 17 swings the shift lever 7 about the pivot P1 such that the one end of the shift lever 7 is shifted toward the core body 17. This moves the other end of the shift lever 4 toward the ring gear 5 so that the movable pinion member PM is shifted to the ring gear 5. This allows the pinion 6 to be abutted onto the ring gear 5.

At that time, when the pinion 6 is not engaged with the ring gear 5, the drive spring is pressed to be contracted so that reactive force is charged in the drive spring. This biases the pinion 6 toward the ring gear 5.

After the first delay time DT1 by the delay circuit 36 has elapsed since the first energization timing t1 (see FIG. 3), the electric power is outputted from the delay circuit 36 and supplied to the solenoid 35a of the second drive relay 35 via the second diode 41 so that the solenoid 35a is energized. The energization of the solenoid 35a turns on the switch 35b so that the second solenoid 16 is energized based on the electric power of the battery 25 at the second energization timing t2.

The energized second solenoid 16 creates a magnetic flux that magnetizes the fixed core 17. This allows the movable core 28 to be pulled into the second solenoid 16 against the elastic force of the return spring 37 so that the rod 38 is shifted toward the fixed core 17 together with the movable core 28. Because the movable contact 33 is biased by the contact-pressure spring 39 toward the movable core 28, the movable contact 33 is shifted toward the movable core 28 together with the shift of the rod 38 toward the fixed core 17.

When the rod 38 is shifted so that the movable contact 33 is abutted onto the stationary contacts 32a and 32b by the preset pressure based on the elastic force of the contact-pressure spring 39, the stationary contacts 32a and 32b are electrically connected to each other. This electrical conduction between the stationary contacts 32a and 32b allows the electric power of the battery 25 to be applied to the armature 11 of the motor 3 via the commutator segments CM and the blushes 12.

When energized, the armature 11 generates a magnetic field. The generated magnetic field of the armature 11 and the magnetic field generated by the field members 10 rotate the armature 11 relative to the field members 10 to thereby rotate the output shaft 4. The rotation of the output shaft 4 is transferred to the pinion 6 via the clutch 13.

When the pinion 6 is turned based on the rotation of the output shaft 4 to a position where the pinion 6 is engageable with the ring gear 5, the reactive force charged in the drive spring causes the pinion 6 to be meshed with the ring gear 5. The rotation of the motor 3 is transferred from the pinion 6 to the ring gear 5 so that the crankshaft CS of the engine EN is rotated, thus cranking the engine EN.

Second, operations of the engine starting system SS to restart the engine EN after the engine automatic stop task has been applied to the engine EN will be described. These operations are carried out in accordance with a routine (engine restarting routine) to be repeatedly executed by the ECU 2 illustrated in FIG. 4.

During the crankshaft CS of the engine EN being decelerated (coasting) before the complete stop of the rotation of the crankshaft CS, when an engine restart request occurs (YES in the determination of step S1), the ECU 2 determines the first energization timing t11 according to the rotational speed of the crankshaft CS of the engine EN, and sends the electric ON signal to the first drive relay 23 at the first energization timing t11 in step S2. In step S2, the ECU 2 can send the electric ON signal to the first drive relay 23 at the first energization timing t11 in synchronization with the occurrence of the engine restart request, thus energizing the solenoid 23a of the first drive relay 23.

As described above, the energization of the solenoid 23a turns on the switch 23b so that the first solenoid 15 is energized based on the electric power of the battery 25 at the first energization timing. The energized first solenoid 15 swings the shift lever 7 about the pivot PI such that the one end of the shift lever 7 is shifted toward the core body 17. This moves the other end of the shift lever 4 toward the ring gear 5 so that the movable pinion member PM is shifted to the ring gear 5.

The shift of the pinion 6 to the ring gear 5 allows the pinion 6 to be meshed with the ring gear 5 or abutted onto the ring gear 5. If the pinion 6 is abutted onto the ring gear 5, because the ring gear 5 coasts (is turned without the aid of the engine EN), when the ring gear 5 is turned to a position where the pinion 6 is engageable with the ring gear 5, the reactive force charged in the drive spring causes the pinion 6 to be meshed with the ring gear 5.

Next, the ECU 2 determines a second delay time DT2 (see FIG. 5 or FIG. 6) according to the rotational speed of the crankshaft CS of the engine EN in step S3, and sends the electric ON signal to the second drive relay 35 at the timing (second energization timing t12) when the second delay time DT2 has elapsed since the first energization timing t11 in step S4. The operation in step S4 energizes the solenoid 35a. The energization of the solenoid 35a turns on the switch 35b so that the second solenoid 16 is energized based on the electric power of the battery 25 at the second energization timing t12.

The energized second solenoid 16 shifts the movable contact 33 toward the movable core 28 together with the shift of the rod 38 toward the fixed core 17.

When the rod 38 is shifted so that the movable contact 33 is abutted onto the stationary contacts 32a and 32b by the preset pressure based on the elastic force of the contact-pressure spring 39, the stationary contacts 32a and 32b are electrically connected to each other. This electrical conduction between the stationary contacts 32a and 32b rotates the armature 11 relative to the field members 10 to thereby rotate the output shaft 4. The rotation of the output shaft 4 is transferred to the pinion 6 via the clutch 13.

Because the pinion 6 has been meshed with the ring gear 5, the rotation of the motor 3 is transferred from the pinion 6 to the ring gear 5 so that the crankshaft CS of the engine EN is rotated, thus cranking the engine EN.

As described above, the engine starting system SS according to the first embodiment is designed to appropriately determine the second delay time DT2 of the second energization timing t12 relative to the first energization timing t11 when an engine restart request occurs during the engine being decelerated. Specifically, the engine starting system SS determines the second delay time DT2 at the engine restart to be different from the first delay time DT1 at the normal engine start according to the relationship between the timing of occurrence of the engine restart request and the rotational speed of the crankshaft CS of the engine EN.

Note that, after the engine automatic stop task has been applied to the engine EN, the rotational speed of the crankshaft CS of the engine EN fluctuates alternately in the forward direction and the reverse direction immediately before complete stop of the crankshaft CS of the engine EN.

Figure 7:
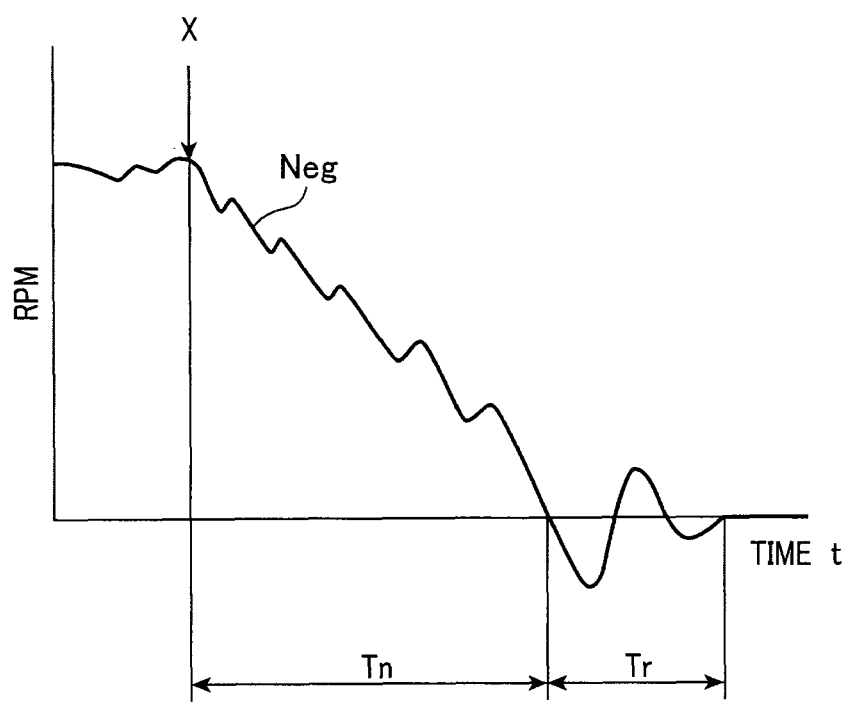
FIG. 7 is an example of a graph schematically illustrating the transition of a rotational speed of a crankshaft of the internal combustion engine over time after an engine automatic stop task has been applied to the internal combustion engine according to the first embodiment.

For example, FIG. 7 schematically illustrates the transition of the rotational speed Neg of the crankshaft CS of the engine EN (the RPM of the engine EN) over time after the engine automatic stop task has been applied to the engine EN.

Specifically, referring to FIG. 7, after the engine automatic stop task has been applied to the engine EN at timing X, the forward rotational speed Neg of the crankshaft CS of the engine EN is decelerated. When a given deceleration period Tn has elapsed since the timing X, the forward rotational speed Neg of the crankshaft CS of the engine EN becomes zero.

Thereafter, the rotational speed Neg of the crankshaft CS of the engine EN fluctuates alternately in the forward direction and the reverse direction within a predetermined fluctuation period Tr, and thereafter, the rotation of the crankshaft CS of the engine EN is completely stopped.

For example, when an engine restart request occurs within the deceleration period Tn, the ECU 2 determines the second delay time DT2 to be shorter than the first delay time DT1 (see FIG. 5) in step S3a. In other words, the ECU 2 determines the second energization timing t12 at the engine restart to be earlier than the second energization timing t2 at the normal engine start.

This restarts the engine EN in response to the occurrence of an engine restart request more rapidly in comparison to the start of the engine EN in response to the driver's operation of the ignition key 24.

In contrast, when an engine restart request occurs within the fluctuation period Tr, the ECU 2 determines the second delay time DT2 to be longer than the first delay time DT1 (see FIG. 6) in step S3b. In other words, the ECU 2 determines the second energization timing t12 at the engine restart to be later than the second energization timing t2 at the normal engine start.

This prevents rotation of the motor 3 before the pinion 6 is meshed with the ring gear 5 to thereby rotate the motor after the pinion 6 has been completely engaged with the ring gear 5. This reduces noise due to rotation of the pinion 6 and the ring gear 5 with their incomplete engagement.

In addition, when an engine restart request occurs after the rotation of the crankshaft CS of the engine EN has been completely stopped, the ECU 2 determines the second delay time DT2 to be shorter than the first delay time DT1 (see step S3a). This restarts the engine EN in response to the occurrence of an engine restart request more rapidly in comparison to the start of the engine EN in response to the driver's operation of the ignition key 24.

As described above, the engine starting system SS according to the first embodiment is designed to individually control the activation of the solenoid actuator 8 operative to shift the pinion 6 to the ring gear 5 and the activation of the motor-energization switch 9 operative to energize or deenergize the motor 3. This design allows the first delay time DT1 at the normal engine start and the second delay time DT2 at the engine restart to be individually determined appropriately for the respective cases. This results in improving the engine-restarting response to the occurrence of an engine restart request to thereby meet requirements to more rapidly restart the engine after the engine automatic stop task has been applied to the engine EN.

The engine starting system SS according to the first embodiment is also designed to determine a value of the second delay time DT2 appropriately for the rotational speed of the crankshaft CS of the engine EN at the occurrence of an engine restart request. That is, the engine starting system SS is designed to appropriately determine values of the second delay time DT2 for respective cases where:

an engine restart request occurs within the deceleration period Tn;

an engine restart request occurs within the fluctuation period Tr; and an engine restart request occurs after the rotation of the crankshaft CS of the engine EN has been completely stopped.

This meets the requirements to more rapidly restart the engine after the engine automatic stop task has been applied to the engine EN as much as possible without increasing noise due to the rotation of the pinion 6 and the ring gear 5 with their incomplete engagement.

Second Embodiment

The engine starting system SS according to the first embodiment is designed such that the solenoid actuator 8 for shifting the movable pinion member PM to the ring gear 5 of the engine EN, and the motor-energizing switch 9 for energizing and deenergizing the motor 3 are combined with each other.

The present invention is however not limited to the structure of the engine starting system SS according to the first embodiment.

Figure 8:
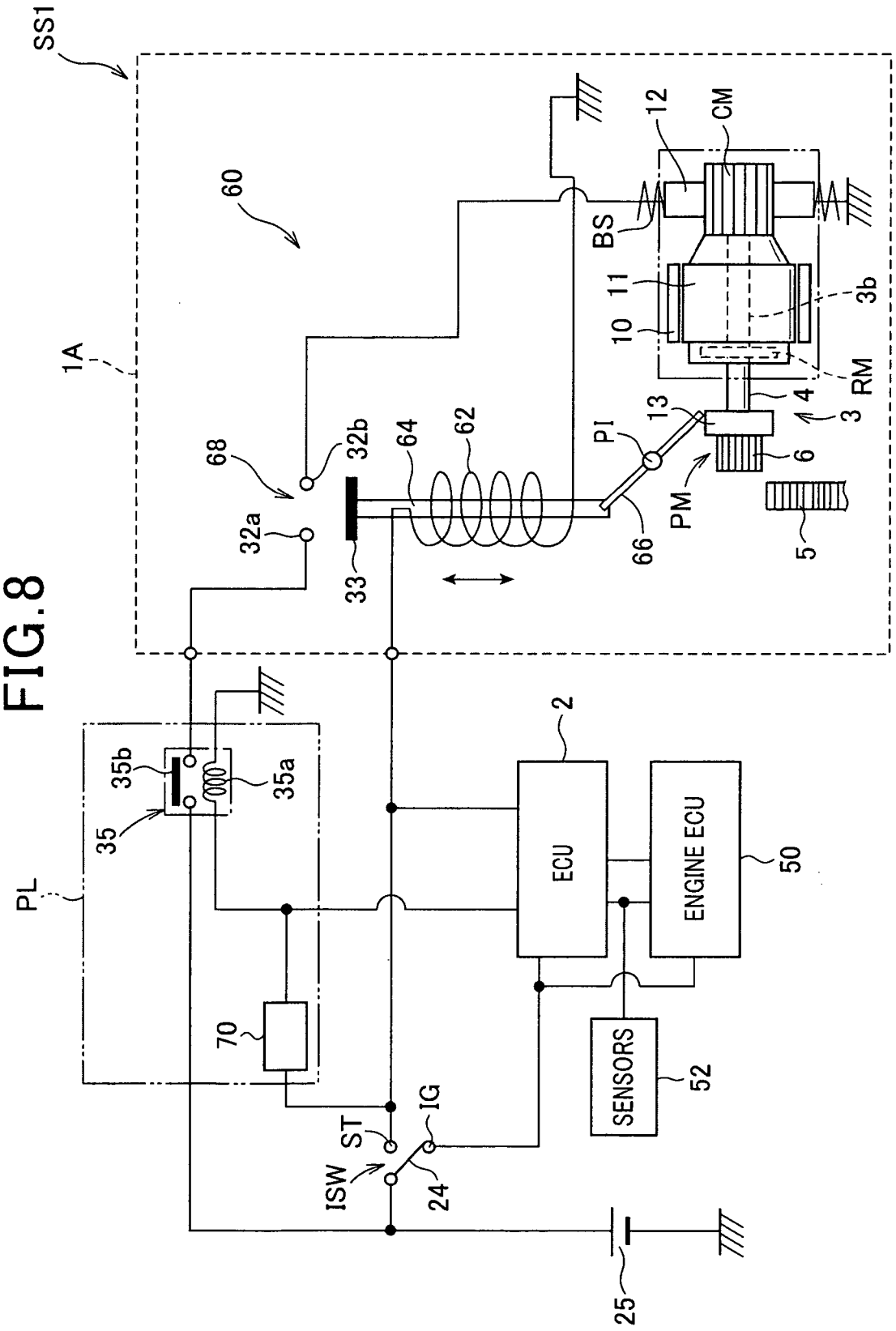
FIG. 8 is an electrical circuit diagram of an engine starting system according to the second embodiment of the present invention.

FIG. 8 represents an engine starting system SS1 according to the second embodiment of the present invention.

Referring to FIG. 8, the engine starting system SS1 includes a starter 1A, an ECU 2, a drive relay 35, a battery 25, and a delay circuit 70.

In comparison to the structure of the starter 1, the starter 1A is comprised of a solenoid switch 60 in place of the solenoid actuator 8 and the motor-energizing switch 9; this solenoid switch 60 serves as the solenoid actuator 8 and the motor-energizing switch 9.

The solenoid switch 60 is comprised of a solenoid 62, a plunger 64, a shift lever 66, a movable pinion member PM, a relay (switch) 68, a delay circuit 70, and a motor 3. Like the engine starting system SS, the movable pinion member PM consists of a pinion 6 and a clutch 13, and the relay 68 consists of a pair of stationary contacts 32a and 32b and a movable contact 33. In addition, like the engine starting system SS, the motor 3 is made up of a yoke 3a, a plurality of field members 10, an output shaft 3b, an annular armature (rotor) 11, and a pair of brushes 12.

The solenoid 62 is wound around the plunger 64 that is slidably provided in the solenoid switch 60. One end of the shift lever 66 is pivotally linked to one end of the plunger 64, and the other end of the plunger 64 is joined to the movable contact 33. The other end of the shift lever 66 is pivotally linked to the movable pinion member PM is pivoted about a pivot PI located at its substantially center in the length direction.

When the plunger 64 is shifted in the axial direction of the solenoid 62, the shift lever 66 is pivoted so that the movable pinion member PM is shifted in the axial direction of the output shaft 4. The engine EN is placed such that the shift of the movable pinion member PM allows the pinion 6 to be engaged with a ring gear 5 directly or indirectly coupled to the crankshaft CS of the engine EN.

In the engine starting system SS1, one end of the solenoid 62 is electrically connected to the starter-ON position ST of the ignition switch ISW, and the other end thereof is grounded. The ECU 2 is also electrically connected to the one end of the solenoid 62. One end of the solenoid 35a of the drive relay 35 is electrically connected to the ECU 2 and to the starter-ON position ST through the delay circuit 70, and the other end is grounded.

When the ignition key 24 inserted in the key cylinder is turned by the driver from the ignition-ON position 1G to the starter-ON position ST, electric power of the battery 25 is supplied to the solenoid 62 and to the delay circuit 70 so that the output of the electric power from the delay circuit 70 is delayed by a preset first delay time DT1a. After the preset first delay time DT1a has elapsed since the operation of the ignition key 24 from the ignition-ON position 1G to the starter ON position, the electric power is outputted from the delay circuit 70 so that the electric power is supplied to the solenoid 35a, resulting in that the solenoid 35a is energized.

In addition, when an electric ON signal is supplied from the ECU 2 to the solenoid 35a, the solenoid 35a is energized.

The switch 35b of the drive relay 35 is electrically connected between the positive terminal of the battery 25 and the stationary contact 32a of the solenoid switch 60. The switch 35b is turned on (closed) by magnetic force generated when the solenoid 35a is energized so that the motor 3 is energized.

Next, operations of the engine starting system SS1 will be described hereinafter.

First, operations of the engine starting system SS1 to start the engine EN in response to the driver's operation of the ignition key 24 during the engine EN being stopped (the vehicle being parked) will be described. In other words, operations of the engine starting system SS1 in order to normally start the engine EN in response to the driver's operation of the ignition key 24 will be described.

When the ignition key 24 inserted in the key cylinder is turned by the driver from the ignition-ON position 1G to the starter-ON position ST, electric power (engine start signal) of the battery 25 is supplied to the solenoid 62 so that the solenoid 62 is energized based on the electric power of the battery 25 at the first energization timing t1 (see FIG. 3).

The energized solenoid 62 creates a magnetic flux that allows the plunger 64 to be pulled into the solenoid 62. This pull-in stroke of the plunger 64 causes the shift lever 66 to pivot about a pivot PI so that the pinion 6 (movable pinion member PM) is shifted to the ring gear 5 to abut onto the ring gear 5, resulting in that the pinion 6 is stopped.

Immediately after the abutment of the pinion 6 onto the ring gear 5, the pull-in stroke of the plunger 64 allows the movable contact 33 to be contacted onto the stationary contacts 32a and 32b, resulting in that the stationary contacts 32a and 32b are electrically connected to each other. At that time, because the drive relay 35 is in open state (off state), the motor 3 is not energized.

After the first delay time DT1 by the delay circuit 70 has elapsed since the first energization timing t1 (see FIG. 3), the electric power is outputted from the delay circuit 70 and supplied to the solenoid 35a of the drive relay 35 so that the solenoid 35a is energized. The energization of the solenoid 35a turns on the switch 35b so that, because the stationary contacts 32a and 32b are electrically connected to each other, the armature 11 of the motor 3 is energized based on the electric power of the battery 25 at the second energization timing t2.

When energized, the armature 11 generates a magnetic field. The generated magnetic field of the armature 11 and the magnetic field generated by the field members 10 rotate the armature 11 relative to the field members 10 to thereby rotate the output shaft 4. The rotation of the output shaft 4 is transferred to the pinion 6 via the clutch 13.

When the pinion 6 is turned based on the rotation of the output shaft 4 to a position where the pinion 6 is engageable with the ring gear 5, the pinion 6 is meshed with the ring gear 5. The rotation of the motor 3 is transferred from the pinion 6 to the ring gear 5 so that the crankshaft CS of the engine EN is rotated, thus cranking the engine EN.

Second, operations of the engine starting system SS1 to restart the engine EN after the engine automatic stop task has been applied to the engine EN will be described. These operations are carried out in accordance with a routine (engine restarting routine) to be repeatedly executed by the ECU 2 illustrated in FIG. 4.

During the crankshaft CS of the engine EN being decelerated (coasting) before the complete stop of the rotation of the crankshaft CS, when an engine restart request occurs (YES in the determination of step S1), the ECU 2 determines the first energization timing t11 according to the rotational speed of the crankshaft CS of the engine EN, and sends the electric ON signal to the solenoid 62 at the first energization timing t11 in step S2. In step S2, the ECU 2 can send the electric ON signal to the solenoid 62 at the first energization timing t11 in synchronization with the occurrence of the engine restart request, thus energizing the solenoid 62.

As described above, the energization of the solenoid 62 creates a magnetic flux that allows the plunger 64 to be pulled into the solenoid 62. This pull-in stroke of the plunger 64 causes the shift lever 66 to pivot about a pivot PI so that the pinion 6 (movable pinion member PM) is shifted to the ring gear 5.

The shift of the pinion 6 to the ring gear 5 allows the pinion 6 to be meshed with the ring gear 5 or abutted onto the ring gear 5. If the pinion 6 is abutted onto the ring gear 5, because the ring gear 5 coasts (is turned without the aid of the engine EN), when the ring gear 5 is turned to a position where the pinion 6 is engageable with the ring gear 5, the pinion 6 is meshed with the ring gear 5.

Immediately after the abutment of the pinion 6 onto the ring gear 5, the pull-in stroke of the plunger 64 allows the movable contact 33 to be contacted onto the stationary contacts 32a and 32b, resulting in that the stationary contacts 32a and 32b are electrically connected to each other. At that time, because the drive relay 35 is in open state (off state), the motor 3 is not energized.

Next, the ECU 2 determines a second delay time DT2 (see FIG. 5 or FIG. 6) according to the rotational speed of the crankshaft CS of the engine EN in step S3, and sends the electric ON signal to the drive relay 35 at the timing (second energization timing t12) when the second delay time DT2 has elapsed since the first energization timing t11 in step S4. The operation in step S4 energizes the solenoid 35a. The energization of the solenoid 35a turns on the switch 35b so that, because the stationary contacts 32a and 32b are electrically connected to each other, the armature 11 of the motor 3 is energized based on the electric power of the battery 25 at the second energization timing t12.

When energized, the armature 11 generates a magnetic field. The generated magnetic field of the armature 11 and the magnetic field generated by the field members 10 rotate the armature 11 relative to the field members 10 to thereby rotate the output shaft 4. The rotation of the output shaft 4 is transferred to the pinion 6 via the clutch 13.

Because the pinion 6 has been meshed with the ring gear 5, the rotation of the motor 3 is transferred from the pinion 6 to the ring gear 5 so that the crankshaft CS of the engine EN is rotated, thus cranking the engine EN.

As described above, the engine starting system SS1 according to the second embodiment is designed to appropriately determine the second delay time DT2 of the second energization timing t12 relative to the first energization timing t11 when an engine restart request occurs during the engine being decelerated. Specifically, the engine starting system SS1 determines the second delay time DT2 at the engine restart to be different from the first delay time DT1 at the normal engine start according to the relationship between the timing of occurrence of the engine restart request and the rotational speed of the crankshaft CS of the engine EN.

Thus, the engine starting system SS1 according to the second embodiment achieves the aforementioned advantages achieved by the engine starting system SS according to the first embodiment.

In each of the first and second embodiments, the ECU 2 is configured to determine the second delay time DT2 (the second energization timing t12) according to the rotational speed of the crankshaft CS of the engine EN in step S3, but the present invention is not limited to the configuration.

Specifically, each of the engine starting systems SS and SS1 according to the first modification can be comprised of an engagement sensor operative to detect the state of engagement between the pinion 6 and the ring gear 5. The ECU 2 can be configured to determine the second delay time DT2 (the second energization timing t12) according to the state of engagement between the pinion 6 and the ring gear 5 detected by the engagement sensor in addition to or in place of the rotational speed of the crankshaft CS of the engine EN. This first modification allows the ECU 2 to energize the motor 3 after the pinion 6 has been meshed with the ring gear 5. This more reduces the shock due to the engagement between the pinion 5 and the ring gear 6, thus preventing damage of the pinion 6.

The engagement sensor can be selected any one of:
a position sensor for detecting the position of the pinion 5;
a sensor for detecting the electrical relationship between the pinion 5 and the ring gear 6; and
a distortion/stress detector for detecting any one of: the amount of distortion (strain) of the pinion 5 or the ring gear 6, and the amount of stress in the pinion 5 or the ring gear 6.

Figure 9:
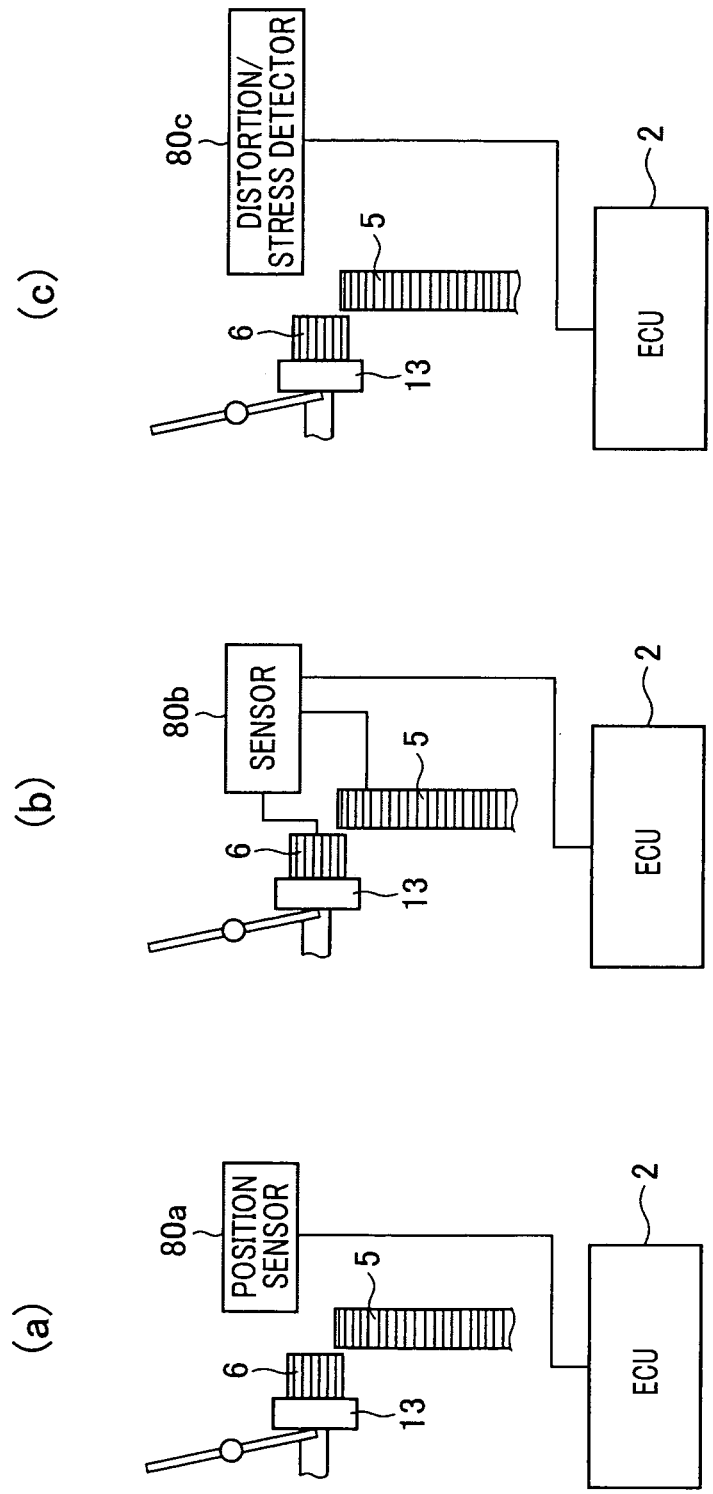
FIG. 9 is a view schematically illustrating examples of an engagement sensor according to each of the first and second embodiments.

Referring to (a) of FIG. 9, when the position sensor is used as the engagement sensor, the position sensor 80a is located close to the pinion 6. The position sensor 80a is operative to directly measure the position of the pinion 6 relative to, for example, its original position (for example, a position farthest apart from the ring gear 6, see FIG. 1), and output the measured position of the pinion 6 to the ECU 2. The ECU 2 is operative to determine whether the pinion 5 is meshed with the ring gear 6 according to the measured position of the pinion 6, and determine the second delay time DT2 (the second energization timing t12) according to the result of the determination of whether the pinion 5 is meshed with the ring gear 6 in step S3.

The pinion sensor 80a can also be located close to the clutch 13, the plunger 21, or the shift lever 7. In this location, the pinion sensor 80a is operative to measure the position of the clutch 13, plunger 21, or shift lever 7 relative to, for example, its original position corresponding to the original position of the pinion 6, and convert the measured position of the clutch 13, plunger 21, or shift lever 7 into the position of the pinion 6 to thereby indirectly measure the position of the pinion 5 relative to, for example, its original position. The pinion sensor 80a is operative to output the measured position of the pinion 6 to the ECU 2. The ECU 2 is operative to determine whether the pinion 5 is meshed with the ring gear 6 according to the measured position of the pinion 6, and determine the second delay time DT2 (the second energization timing t12) according to the result of the determination of whether the pinion 5 is meshed with the ring gear 6 in step S3.

Referring to (b) of FIG. 9, when the sensor for detecting the electrical relationship between the pinion 5 and the ring gear 6 is used as the engagement sensor, one terminal of the sensor 80b is electrically connected the pinion 6 or a first conductive member electrically connected thereto, and another terminal of the sensor 80b is electrically connected to the ring gear 5 or a second conductive member electrically connected to the ring gear 5. When the starter 1 or 1A is inactivated, the pinion 6 (or the first conductive member) and the ring gear 5 (or the second conductive member) are individually insulated, and an electrical potential difference is applied between the pinion 6 (or the first conductive member) and the ring gear 5 (or the second conductive member).

Because, when the pinion 6 is meshed with the ring gear 5, the potential difference between the pinion 6 (or the first conductive member) and the ring gear 5 (or the second conductive member) becomes zero, the sensor 80b is operative to detect that the potential difference becomes zero and output a signal indicative of the potential difference of zero to the ECU 2. The ECU 2 is operative to determine whether the pinion 5 is meshed with the ring gear 6 according to the signal outputted from the sensor 80b, and determine the second delay time DT2 (the second energization timing t12) according to the result of the determination of whether the pinion 5 is meshed with the ring gear 6 in step S3.

Referring to (c) of FIG. 9, when distortion/stress detector is used as the engagement sensor, the distortion/stress detector 80c is located close to both the pinion 6 and the ring gear 5. The distortion/stress detector 80c is operative to measure any one of: the amount of distortion (strain) of at least one of the pinion 5 and the ring gear 6, and the amount of stress in at least one of the pinion 5 and the ring gear 6. The distortion/stress detector 80c is also operative to output a signal indicative of any one of: the amount of distortion (strain) of at least one of the pinion 5 and the ring gear 6, and the amount of stress in at least one of the pinion 5 and the ring gear 6. The ECU 2 is operative to determine whether the pinion 5 is meshed with the ring gear 6 according to the signal outputted from the distortion/stress detector 80c, and determine the second delay time DT2 (the second energization timing t12) according to the result of the determination of whether the pinion 5 is meshed with the ring gear 6 in step S3.

Figure 10:
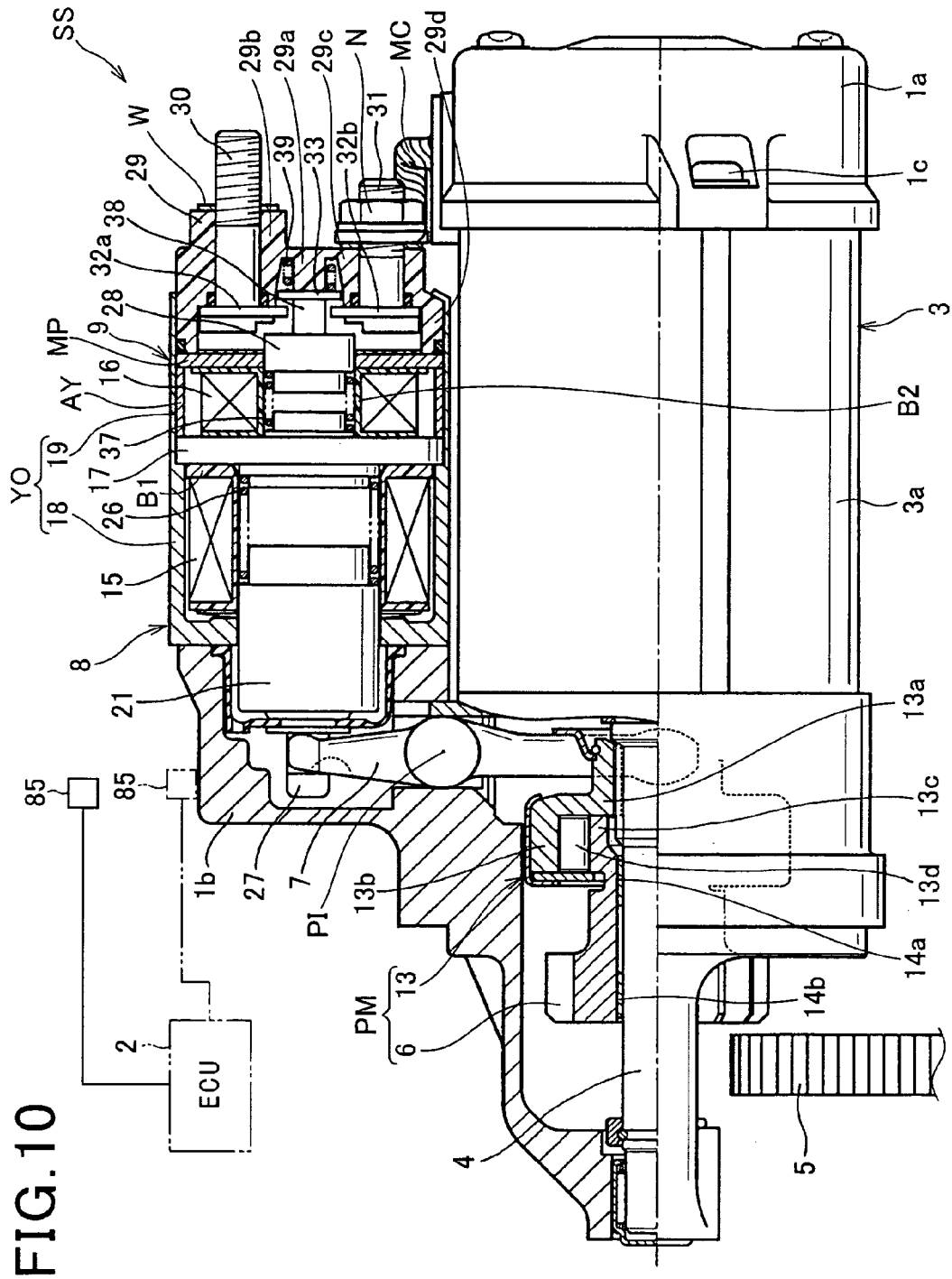
FIG. 10 is a partially axial cross sectional view of a modification of the starter according to the first embodiment of the present invention.
Figure 11:
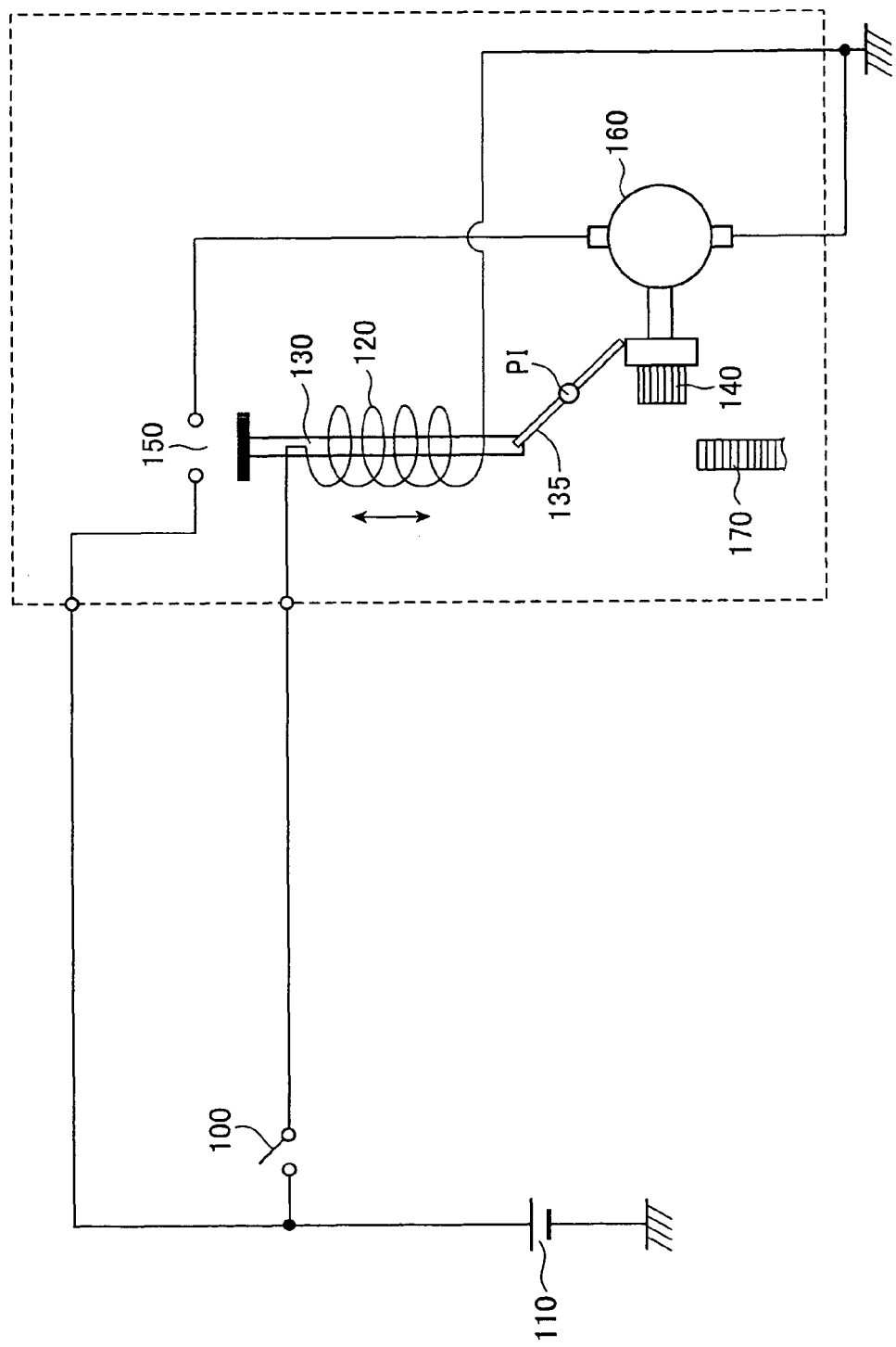
FIG. 11 is an electrical circuit diagram of a conventional starter.

In addition, each of the engine starting systems SS and SS1 according to the first modification can be comprised of a temperature sensor 85 operative to measure the ambient temperature outside the starter 1 or 1A or measure the temperature of a metallic portion of the starter 1 or 1A, such as the starter end housing 1b or the yoke 3a of the motor 3. For example, as illustrated in FIG. 10, the engine starting system SS can include the temperature sensor 85 provided around the starter 1 (see solid reference numeral 85 in FIG. 10), or mounted on the end frame 1b of the starter 1 (see phantom reference numeral 85 in FIG. 10).

The temperature sensor 85 is operative to measure the ambient temperature outside the starter 1 or the temperature of the starter end housing 1b of the starter 1, and output a signal indicative of the ambient temperature outside the starter 1 or the temperature of the starter end housing 1b to the ECU 2.

The ECU 2 is operative to determine the second delay time DT2 (the second energization timing t12) according to the signal outputted from the temperature sensor 85 in addition to or in place of the rotational speed of the crankshaft CS of the engine EN in step S3.

Note that the viscosity of the grease put onto the slidably contact portions of some parts of the starter 1 may significantly change depending on the ambient temperature outside the starter 1 or the temperature of the starter 1.

Specifically, the viscosity of the grease put onto the slidably contact portions of some parts of the starter 1 may be high with the ambient temperature outside the starter 1 or the temperature of the starter 1 being low. This characteristic of the grease may result in a longer time required for the pinion 6 to be engaged with the ring gear 5.

In contrast, the viscosity of the grease put onto the slidably contact portions of some parts of the starter 1 may be low with the ambient temperature outside the starter 1 or the temperature of the starter 1 being high. This characteristic of the grease may result in a shorter time required for the pinion 6 to be engaged with the ring gear 5.

For this reason, the ECU 2 is operative to delay the second energization timing t12 (see FIGS. 3 and 5) to thereby lengthen the second delay time DT2 when the signal outputted from the temperature sensor 85 represents that the ambient temperature outside the starter 1 or the temperature of the starter end housing 1b of the starter 1 is low. This operation of the ECU 2 allows energization of the motor 3 after the pinion 6 has been reliably meshed with the ring gear 5.

In contrast, the ECU 2 is operative to accelerate the second energization timing t12 (see FIGS. 3 and 5) to thereby reduce the second delay time DT2 when the signal outputted from the temperature sensor 85 represents that the ambient temperature outside the starter 1 or the temperature of the starter end housing 1b of the starter 1 is high. This operation of the ECU 2 allows the engine EN to be more rapidly restarted in comparison to where the ECU 2 does not carry out the acceleration.

In each of the first and second embodiment, the starter 1 or 1A is configured such that the solenoid actuator 8 and the motor-energizing switch 9 are integrated with each other, but the present invention is not limited to the configuration.

Specifically, the starter 1 or 1A can be configured such that the solenoid actuator 8 and the motor-energizing switch 9 are separated from each other. In this modification, each of the solenoid actuator 8 and the motor-energizing switch 9 has a special housing in which all of its elements are installed. In this modification, the motor-energizing switch 9 can be separately provided from the starter 1 or 1A; this starter will be referred to as "switch-separated starter".

In comparison to each of the starter 1 or 1A according to the first or second embodiment, the switch-separated starter achieves space saving. Because the motor-energizing switch 9 is smaller in size than the switch-separated starter, it can be easily arranged in an empty space in the engine room of the motor vehicle, thus improving the installability of the engine starting system according to this modification.

Because an easily available solenoid relay can be used as the motor-energizing switch 9, it is possible to reduce the engine starting system comprised of the switch-separated starter in cost.

In each of the first and second embodiments, when the ignition key 24 inserted in the key cylinder is turned by the driver from the ignition-ON position IG to the starter-ON position ST, the ignition switch ISW serving as a starter switch is turned on so that electric power of the battery 25 is supplied to the solenoid 23*a* and to the delay circuit 36 as the engine starting signal, but the present invention is not limited to the structure.

Specifically, a driver-operable starter switch, such as a push-button switch, can be provided in the motor vehicle. In this modification, when the driver-operable starter switch is operated by the driver, electric power of the battery 25 is supplied to the solenoid 23*a* and to the delay circuit 36 as the engine starting signal.

In the second embodiment, the delay circuit 70 can be integrated with the drive relay 35 (see phantom line PL). In this modification, a single output port of the ECU 2 can be electrically connected to both the solenoid 35*a* of the drive relay 35 and the solenoid 62 of the solenoid switch 60. The configuration of this modification reduces the number of output ports of the ECU 2 in comparison to that of the ECU 2 according to the second embodiment, thus reducing the engine starting system SS1 in cost.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. An engine starting system comprising:
   a motor that generates torque when power is supplied from a battery thereto;
   an output shaft that rotates when the torque of the motor is transferred thereto;
   a pinion that shifts to an engine on an outer surface of the output shaft to be engaged with a ring gear to transfer the torque of the motor to the ring gear;
   a pinion driving solenoid having a first coil that forms an electromagnet when energized, the pinion driving solenoid shifting the pinion to the engine using pull-in force of the electromagnet; and
   a motor energizing switch having a second coil that forms an electromagnet when energized, the motor energizing switch opening or closing, based on energization or deenergization of the second coil, a main contact for on-and-off of an energizing current to the motor,
   the engine starting system being configured to restart the engine by activating the pinion driving solenoid and the motor energizing switch when an engine restart request occurs during the engine being stopped;
   the engine starting system further comprising:
      a timing delay means that determines a delay time between a first energization timing and a second energization timing during each of: i) key start of the engine in response to an engine start signal generated by a turn-on operation of an ignition key and ii) restart of the engine in response to an occurrence of an engine restart request,
         the first energization timing representing a timing of energizing the pinion driving solenoid,
         the second energization timing representing a timing of energizing the motor energizing switch, and
         the timing delay means determining different values of the delay time for the key start of the engine and for the restart of the engine, respectively, to determine the second energization timing.

2. The engine starting system according to claim 1, wherein the motor energizing switch is configured to be separated from a starter integrating the pinion driving solenoid.

3. The engine starting system according to claim 1, wherein the motor energizing switch is configured to be integrated in the starter together with the pinion driving solenoid.

4. An engine starting system comprising:
   a motor that generates torque when power is supplied from a battery thereto;
   an output shaft that rotates when the torque of the motor is transferred thereto;
   a pinion that shifts to an engine on an outer surface of the output shaft to be engaged with a ring gear to transfer the torque of the motor to the ring gear
   one of: i) an electromagnetic switch including an electromagnetic coil that forms an electromagnet when an energizing current is supplied thereto from a battery, and a plunger that is shifted on an inner circumference of the electromagnetic coil in an axial direction by pull-in force of the electromagnet, the electromagnetic switch shifting the pinion to the engine with the shift of the plunger, and opening or closing a main contact for on-and-off of an energizing current to the motor, or ii) a pinion driving solenoid having a first coil that forms an electromagnet when energized, the pinion driving solenoid shifting the pinion to the engine using pull-in force of the electromagnet ; and
   one of: i) a motor energizing relay with a relay contact connected to a power line through which power is supplied from the battery to the motor via the main contact, or ii) a motor energizing switch having a second coil that forms an electromagnet when energized, the motor energizing switch opening or closing, based on energization or deenergization of the second coil, a main contact for on-and-off of an energizing current to the motor,
   the engine starting system being configured to restart the engine by activating either: i) the electromagnetic switch or ii) the pinion driving solenoid, and either i) the motor energizing relay, or ii) the motor energizing switch, when an engine restart request occurs during the engine being stopped;
   the engine starting system further comprising:
      a timing delay means that determines a delay time between a first energization timing and a second energization timing during each of: i) key start of the engine in response to an engine start signal generated by a turn-on operation of an ignition key, and ii) restart of the engine in response to an occurrence of an engine restart request,
         the first energization timing representing a timing of energizing either i) the electromagnetic switch, or ii) the pinion driving solenoid,
         the second energization timing representing a timing of energizing either i) the motor energizing relay, or ii) the motor energizing switch, and
         the timing delay means determining different values of the delay time for the key start of the engine and for the restart of the engine, respectively, to determine the second energization timing.

5. The engine starting system according to claim 1, wherein, when a period from temporal reverse rotation of the engine to stop of the engine immediately before stop the engine during the engine being stopped is referred to as an engine fluctuating period, and a period before the engine fluctuating period, which is a period during which a speed of the engine decelerated after a process of the engine being stopped, is referred to as an engine decelerating period, the timing delay means sets the second energization timing for the restart of the engine to be earlier than the second energization timing for the key start of the engine during the engine decelerating period.

6. The engine starting system according to claim 1, wherein, when a period from temporal reverse rotation of the engine to stop of the engine immediately before stop the engine during the engine being stopped is referred to as an engine fluctuating period, and a period before the engine fluctuating period, which is a period during which a speed of the engine decelerated after a process of the engine being stopped, is referred to as an engine decelerating period, the timing determining means delays the second energization timing for the restart of the engine relative to the second energization timing for the key start of the engine during the engine fluctuating period.

7. The engine starting system according to claim 1, further comprising:
an engagement sensor that measures a state of engagement between the pinion and the ring gear,
wherein the timing delay means determines the second energization timing for the restart of the engine according to a result measured by the engagement sensor.

8. The engine starting system according to claim 7, wherein the engagement sensor measures the state of engagement between the pinion and the ring gear by directly or indirectly measuring a position of the pinion.

9. The engine starting system according to claim 7, wherein the engagement sensor measures the state of engagement between the pinion and the ring gear by measuring an energized state between the pinion and the ring gear.

10. The engine starting system according to claim 7, wherein the engagement sensor measures the state of engagement between the pinion and the ring gear by measuring distortion of one of the pinion and the ring gear.

11. The engine starting system according to claim 1, wherein the timing delay means determines the second energization timing for the restart of the engine according to one of an outside temperature and a temperature of a starter integrating the pinion driving solenoid, especially a metal part of the starter.

12. The engine starting system according to claim 1, wherein the timing delay means comprises:
a delay circuit that determines a delay time of the second energization timing relative to the first energization timing for the key start of the engine; and
a controller that controls the first energization timing and the second energization timing for the restart of the engine.

13. The engine starting system according to claim 12, wherein the delay circuit is integrated in a motor energizing relay, the motor energizing relay including a relay contact connected to a power line through which power is supplied from the battery to the motor via the main contact.

* * * * *